United States Patent
Han et al.

(10) Patent No.: US 10,203,802 B2
(45) Date of Patent: Feb. 12, 2019

(54) DRIVER CIRCUIT, TOUCH DISPLAY DEVICE, AND METHOD OF DRIVING THE TOUCH DISPLAY DEVICE

(71) Applicant: LG DISPLAY CO., LTD., Seoul (KR)

(72) Inventors: Sungsu Han, Gyeonggi-do (KR); CheolSe Kim, Daegu (KR); SungChul Kim, Gyeonggi-do (KR); Suyun Ju, Gangwon-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/478,613

(22) Filed: Apr. 4, 2017

(65) Prior Publication Data
US 2017/0293388 A1 Oct. 12, 2017

(30) Foreign Application Priority Data
Apr. 6, 2016 (KR) .................. 10-2016-0042419

(51) Int. Cl.
| | |
|---|---|
| G06F 3/041 | (2006.01) |
| G06F 3/044 | (2006.01) |
| G02F 1/1333 | (2006.01) |
| G02F 1/1343 | (2006.01) |

(52) U.S. Cl.
CPC ........ *G06F 3/0416* (2013.01); *G02F 1/13338* (2013.01); *G02F 1/134309* (2013.01); *G06F 3/044* (2013.01); *G06F 3/0414* (2013.01)

(58) Field of Classification Search
None
See application file for complete search history.

(56) References Cited

U.S. PATENT DOCUMENTS

| | | | |
|---|---|---|---|
| 2011/0128254 A1* | 6/2011 | Teranishi | G06F 3/044 345/174 |
| 2014/0247239 A1* | 9/2014 | Jamshidi-Roudbari | G06F 3/0414 345/174 |
| 2017/0269773 A1* | 9/2017 | Suzuki | G06F 3/0416 |

* cited by examiner

*Primary Examiner* — Duane N Taylor, Jr.
(74) *Attorney, Agent, or Firm* — Morgan, Lewis & Bockius LLP

(57) ABSTRACT

A driver circuit, a touch display device, and a method of driving the touch display device. Touching force is sensed by driving a plurality of first electrodes disposed in a display panel and a second electrode located outside of the display panel. The first electrodes corresponding to force sensors for sensing the touching force and the second electrode are driven by alternating in-phase driving and antiphase driving. Touching force components are selectively and accurately extracted from sensing data, and the touching force can be accurately sensed.

20 Claims, 29 Drawing Sheets

FIG.3 Case 1
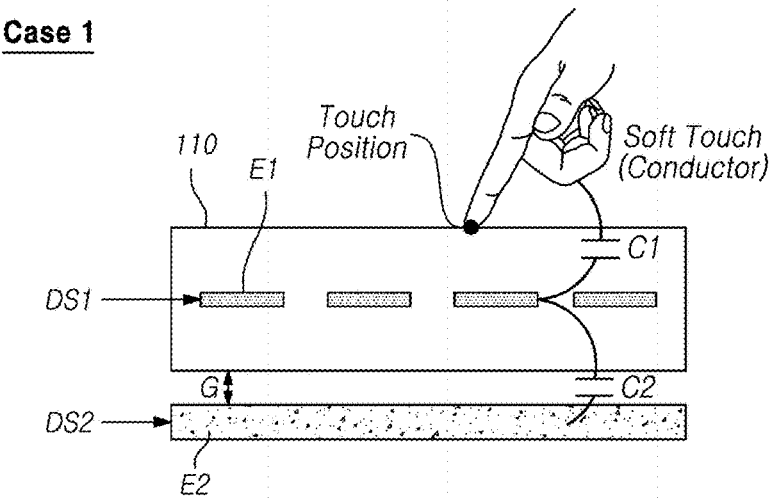
Case 2
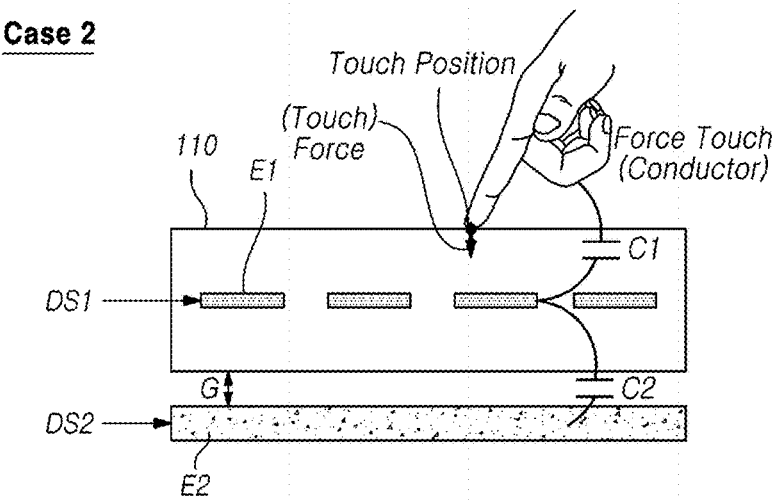
Case 3
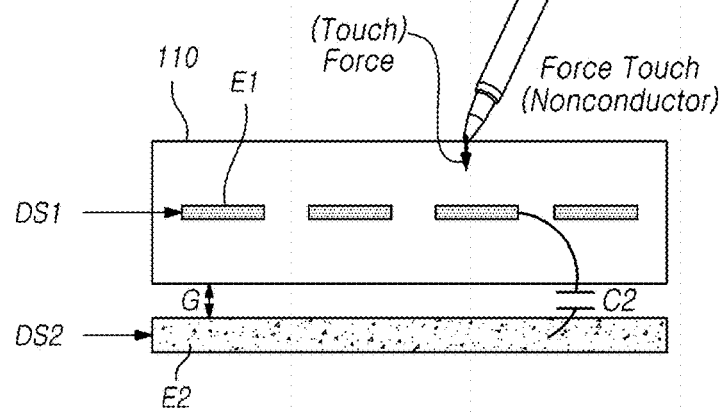

FIG.4
Case 1 & Case 2
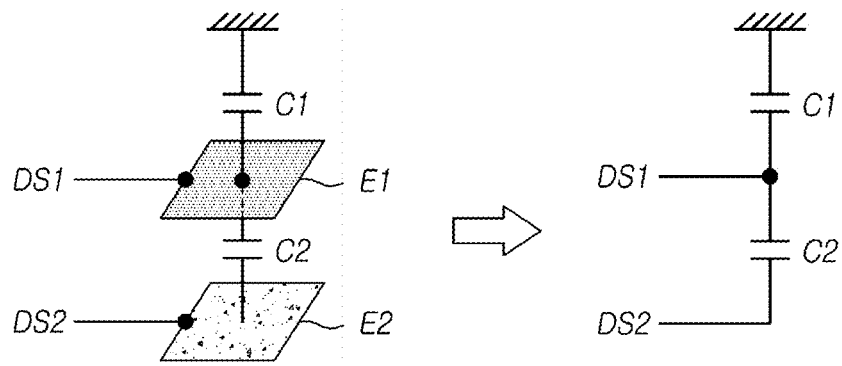
Case 3
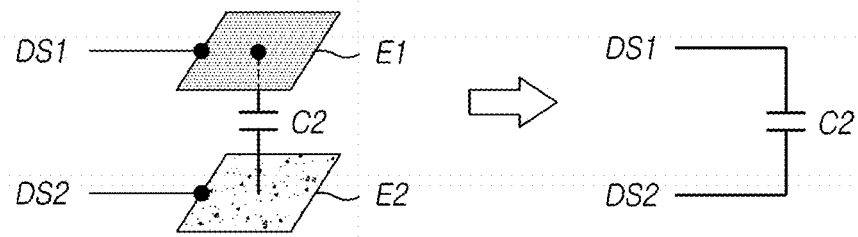

FIG. 14
Driving Type A
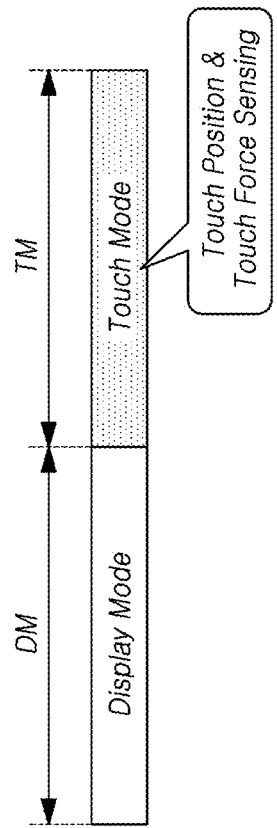
Driving Type B
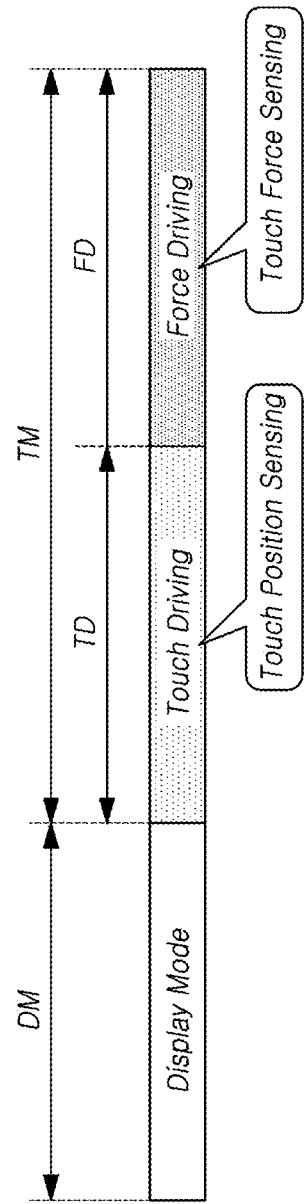

DRIVER CIRCUIT, TOUCH DISPLAY DEVICE, AND METHOD OF DRIVING THE TOUCH DISPLAY DEVICE

CROSS REFERENCE TO RELATED APPLICATION

This application claims priority from Korean Patent Application No. 10-2016-0042419 filed on Apr. 6, 2016, which is hereby incorporated by reference for all purposes as if fully set forth herein.

BACKGROUND

Technical Field

The present disclosure relates to a driver circuit, a touch display device, and a method of driving the touch display device.

Description of Related Art

In response to the development of the information society, demand for a variety of display devices for displaying images is increasing. In this regard, a range of display devices, such as liquid crystal display (LCD) devices, plasma display panels (PDPs), and organic light-emitting diode (OLED) display devices, have recently come into widespread use.

Such display devices may be used in mobile devices, such as smartphones and tablet computers, as well as in medium-sized or larger devices, such as smart televisions, that provide touch-based input interfaces for user convenience, according to various device characteristics.

Such display devices providing a touch-based input interface are being developed to provide a wider range of functions, and user requirements are also becoming ever more diverse.

However, currently available touch-based input interfaces are designed to only sense a point touched by a user (or touch coordinates) and execute input processing at the sensed touched position. Current touch-based input interfaces are limited in current circumstances in which a large number of functions must be provided in a range of types and shapes and a large number of user demands must be satisfied.

SUMMARY

Accordingly, embodiments of the present disclosure are directed to a driver circuit, a touch display device, and a method of driving the touch display device that substantially obviate one or more of the problems due to limitations and disadvantages of the related art.

Various aspects of the present disclosure provide a driver circuit, a touch display device, and a method of driving the touch display device that provide a large number of functions in a variety of forms. When a touch is made by a user, not only touch coordinates (i.e. a touched position) but also touching force corresponding to an amount of force by which the user presses against the screen can be sensed.

Also provided are a touch display device, a driver circuit, and a method of driving the touch display device, in which the touch display device has a structure that can sense touching force corresponding to an amount of force by which the user presses against the screen when touching the screen Also provided are a driver circuit, a touch display device, and a method of driving the touch display device that can accurately sense touching force by selectively and accurately extracting touching force components (touching force variation data) from sensing data obtained by touching force sensing driving (i.e. driving for selectively sensing the touching force or driving for sensing a touched position in addition to the touching force).

Also provided are a driver circuit, a touch display device, and a method of driving the touch display device that can accurately sense a touched position by selectively and accurately extracting touched position components (touched position variation data) from sensing data obtained by touched position sensing driving (i.e. driving for selectively sensing the touched position or driving for sensing touching force in addition to the touched position).

Also provided are a driver circuit, a touch display device, and a method of driving the touch display device that can sense touching force by applying a first electrode driving signal and a second electrode driving signal to first electrodes corresponding to force sensors and a second electrode. The touching force can be accurately sensed by alternately performing in-phase driving, in which the first electrode driving signal and the second electrode driving signal in phase with the first electrode driving signal are provided to the first electrodes and the second electrode, and antiphase driving, in which the first electrode driving signal and the second electrode driving signal in antiphase with the first electrode driving signal are provided to the first electrodes and the second electrode.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

According to an aspect of the present disclosure, provided a touch display device that can sense not only touch coordinates (i.e. a touched position) but also touching force corresponding to an amount of force by which the user presses against the screen.

The touch display device may include a plurality of first electrodes disposed within the display panel and a second electrode located outside of the display panel.

The touch display device may be configured such that a gap is provided between the plurality of first electrodes and the second electrode, the size of the gap being variable depending on touching force applied to the display panel.

The touch display device may include a driver circuit outputting a first electrode driving signal to be provided to at least one first electrode among the plurality of first electrodes and outputting a second electrode driving signal to be provided to the second electrode during each of touch mode sections.

The driver circuit may output the first electrode driving signal and the second electrode driving signal in phase with each other during a first driving section, as well as the first electrode driving signal and the second electrode driving signal in antiphase with each other during a second driving section after or before the first driving section.

According to another aspect of the present disclosure, provided is a driving method for sensing at least one of a touched position corresponding to the position of a point on the screen that has been touched by the user and touching force corresponding to an amount of force by which the user presses against the screen.

The driving method may include: a first driving step of outputting a first electrode driving signal to be provided to at least one first electrode among a plurality of first electrodes disposed within a display panel and outputting a second electrode driving signal to be provided to a second electrode located outside of the display panel during a first driving section; a second driving step of outputting a first electrode driving signal to be provided to at least one first electrode among the plurality of first electrodes and a second driving signal to be provided to the second electrode located outside of the display panel during a second driving section after or before the first driving section; and a sensing step of sensing at least one of a touched position and touching force based on sensing data obtained in the first driving and sensing data obtained in the second driving.

In the first driving step, the first electrode driving signal and the second electrode driving signal may be in phase with each other. In the second driving step, the first electrode driving signal and the second electrode driving signal may be in antiphase with each other.

The first driving section and the second driving section may be present in a single frame section or in different frame sections.

According to further another aspect of the present disclosure, provided is a driver circuit that drives first electrodes corresponding to force sensors and a second electrode.

The driver circuit may drive the first electrodes corresponding to force sensors and the second electrode by alternating an in-phase driving method and an antiphase driving method.

The in-phase driving method may drive the first electrodes corresponding to force sensors and the second electrode using a first electrode driving signal and a second electrode driving signal in phase with each other.

The antiphase driving method may drive the first electrodes corresponding to force sensors and the second electrode using a first electrode driving signal and a second electrode driving signal in antiphase with each other.

The driver circuit may include: a signal generator circuit generating and outputting a first electrode driving signal; a first electrode driver circuit providing the first electrode driving signal to at least one first electrode among a plurality of first electrodes disposed within a display panel during each of touch mode sections; and a second electrode driver circuit providing a second electrode driving signal to a second electrode located outside of the display panel during each of the touch mode sections.

The first electrode driving signal and the second electrode driving signal may be in phase with each other during a preset first driving section. The first electrode driving signal and the second electrode driving signal may be in antiphase with each other during a preset second driving section after or before the first driving section.

According to still another aspect of the present disclosure, a driver circuit (or a first electrode driver circuit) may have operations of: outputting a display driving voltage to be provided to a plurality of first electrodes disposed within a display panel during a display mode section; and outputting a first electrode driving signal to be provided to at least one first electrode among the plurality of first electrodes during each of touch mode sections.

The first electrode driving signal may have a same phase as or a phase difference of 180 degrees from a second electrode driving signal provided to a second electrode located outside of the display panel at or within each of the touch mode sections.

According to the present disclosure as set forth above, the driver circuit, the touch display device, and the method of driving the touch display device can provide a large number of functions in a variety of forms. When a touch is made by a user, not only touch coordinates (i.e. a touched position) but also an amount of touching force by which the user presses against the screen can be sensed.

In addition, according to the present disclosure, the touch display device, the driver circuit, and the method of driving the touch display device are provided. The touch display device has a structure that can sense an amount of touching force by which the user presses against the screen when touching the screen.

Furthermore, according to the present disclosure, the driver circuit, the touch display device, and the method of driving the touch display device can accurately sense touching force by selectively and accurately extracting touching force components (touching force variation data) from sensing data obtained by touching force sensing driving (i.e. driving for selectively sensing the touching force or driving for sensing a touched position in addition to the touching force).

In addition, according to the present disclosure, the driver circuit, the touch display device, and the method of driving the touch display device can accurately sense a touched position by selectively and accurately extracting touched position components (touched position variation data) from sensing data obtained by touched position sensing driving (i.e. driving for selectively sensing the touched position or driving for sensing touching force in addition to the touched position).

Furthermore, according to the present disclosure, the driver circuit, the touch display device, and the method of driving the touch display device can sense touching force by applying a first electrode driving signal and a second electrode driving signal to first electrodes corresponding to force sensors and a second electrode. The touching force can be accurately sensed by alternately performing in-phase driving, in which the first electrode driving signal and the second electrode driving signal in phase with the first electrode driving signal are provided to the first electrodes and the second electrode, and antiphase driving, in which the first electrode driving signal and the second electrode driving signal in antiphase with the first electrode driving signal are provided to the first electrodes and the second electrode.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings:

FIGS. 3 and 4 illustrate the sensing principle of the touch display device according to exemplary embodiments;

FIG. 14 illustrates two driving types (driving type A and driving type B) of the touch display device according to exemplary embodiments in a touch mode section of two operation mode sections;

DETAILED DESCRIPTION

Figure 1:
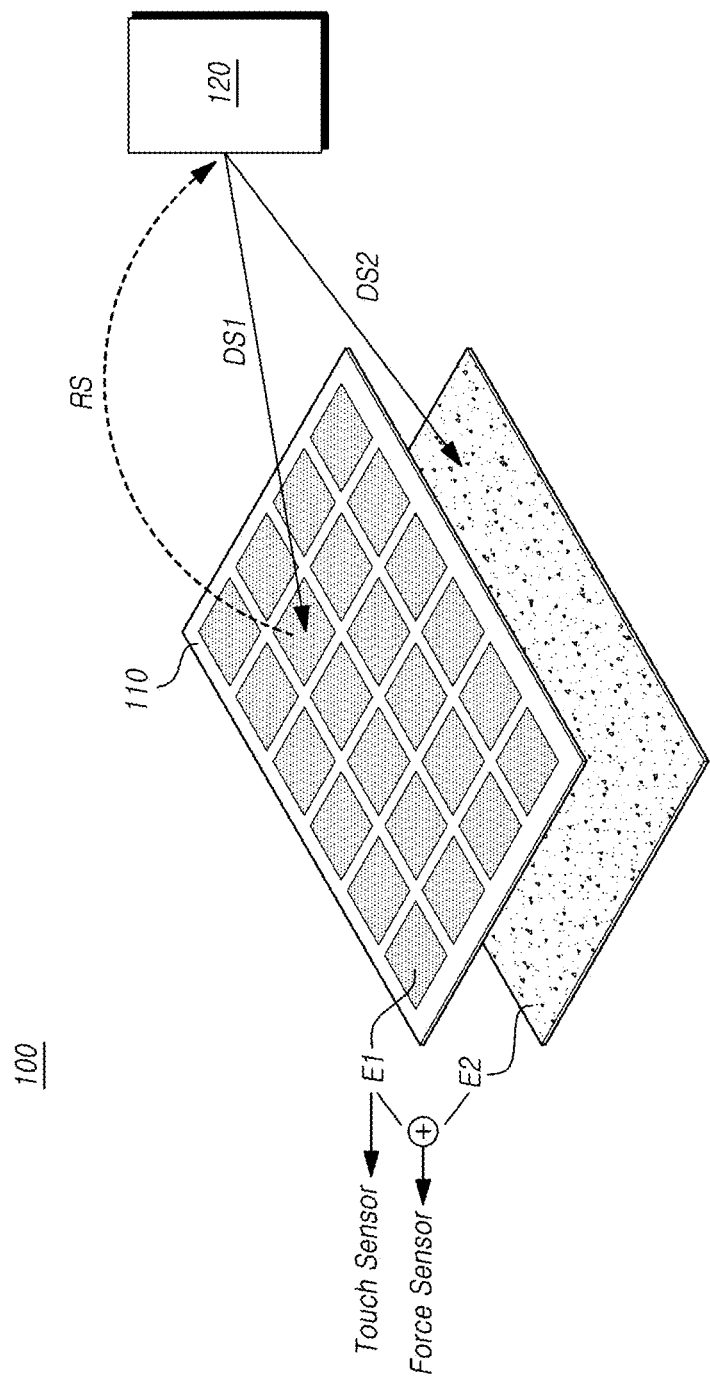
FIG. 1 is a configuration view schematically illustrating a touch display device according to exemplary embodiments.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are only used to distinguish one element from another element. The substance, sequence, order, or number of these elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. In the same context, it will be understood that when an element is referred to as being formed "on" or "under" another element, not only can it be directly formed on or under another element, but it can also be indirectly formed on or under another element via an intervening element.

Figure 2:
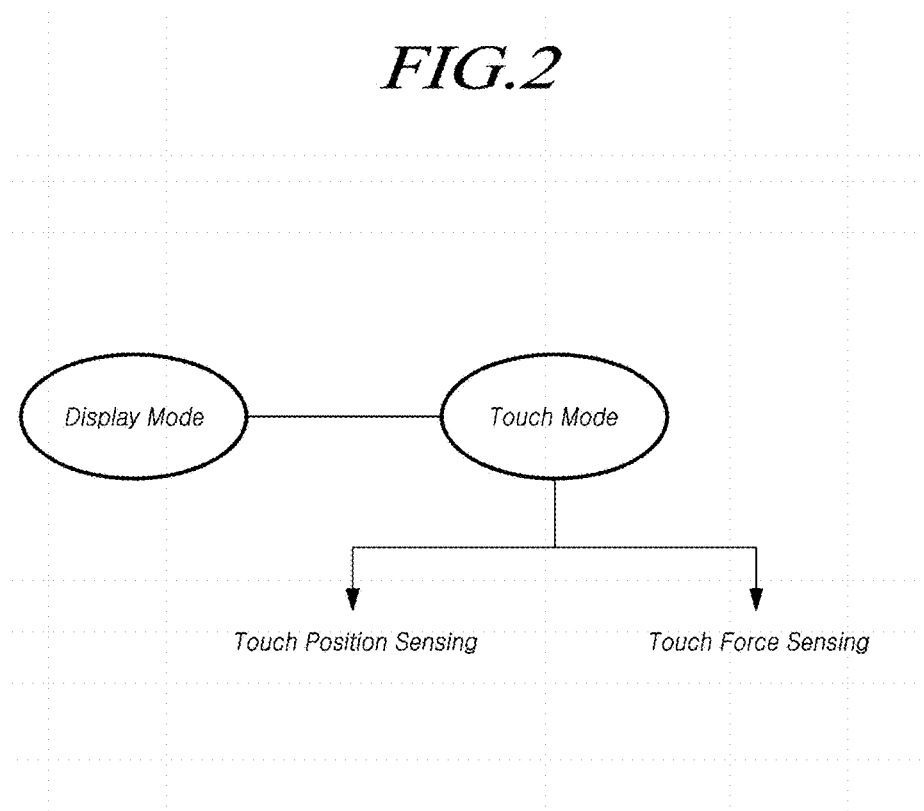
FIG. 2 illustrates operation modes of the touch display device according to exemplary embodiments.

FIG. 1 is a configuration view schematically illustrating a touch display device 100 according to exemplary embodiments, while FIG. 2 illustrates operation modes of the touch display device 100 according to exemplary embodiments.

Referring to FIGS. 1 and 2, the touch display device 100 according to exemplary embodiments can operate in display mode, to display images, as well as in touch mode, to sense a touch made by a user.

The touch display device 100 according to exemplary embodiments displays images by driving data lines and gate lines disposed on a display panel 110 when operating in the display mode.

In the touch mode, when the user touches a screen with a pointer, such as a finger or a stylus, the touch display device 100 according to exemplary embodiments can provide a touched position sensing function to sense a touch and a touched position and a touching force sensing function to sense touching force (simply referred to as "force") corresponding to an amount of force (or pressure) applied when the user touches the screen.

The term "touch" used herein means an action in which the user contacts the display panel 110 with a pointer.

The touch may be divided into "soft touch," in which the display panel 110 is pressed by an amount of force (or pressure) equal to or less than a predetermined amount, and "force touch (or forced touch)," in which the display panel 110 is pressed by an amount of force (or pressure) exceeding the predetermined amount.

A touched position (also referred to as "touch coordinates") caused by a touch (a soft touch or a force touch) means the position of a point on the display panel 110 that has been touched by the user.

The term "touching force" generated by the touch (force touch) means an amount of force (or pressure) by which the user presses against the display panel 110 when touching the display panel.

The pointer with which the user touches the screen may be a conductive pointer, such as a portion of a human body, for example, a finger, or a stylus, a panel contact portion of which is made of a conductive material. Alternatively, the pointer may be a nonconductive pointer, such as a stylus, a panel contact portion of which is made of a nonconductive material.

A pointer allowing a touched position to be sensed must be a conductive pointer. In contrast, a pointer allowing touching force to be sensed may not only be a conductive pointer but also a nonconductive pointer.

Referring to FIGS. 1 and 2, the touch display device 100 according to exemplary embodiments includes: a plurality of first electrodes E1 required to sense a touched position (i.e. a concept including whether or not a touch has been made); a second electrode E2 sensing touching force; and a driver circuit 120 driving the plurality of first electrodes E1 and the second electrode E2 to sense the touched position and the touching force.

The plurality of first electrodes E1 are electrodes used for sensing a touched position, and are also referred to as "touch sensors" or "touch electrodes."

The plurality of first electrodes E1 may be disposed on a touchscreen panel separate from the display panel 110 or may be disposed within the display panel 110.

When the plurality of first electrodes E1 are disposed within the display panel 110, the display panel 110 may be referred to as a "display panel having a built-in touchscreen panel" within which the plurality of first electrodes E1 are provided.

The second electrode E2 is an electrode for sensing touching force corresponding to an amount of force (or pressure) applied when the user touches the display panel 110.

The second electrode E2 may be a single plate electrode or may be comprised of two or more split electrodes.

The second electrode E2 is disposed outside of (e.g. below, above, or on a side of) the display panel 110.

The driver circuit 120 of the touch display device 100 according to exemplary embodiments senses at least one of a touched position and touching force based on signals RS received from the plurality of first electrodes E1.

As described above, the driver circuit 120 can perform signal processing for sensing a touched position and signal processing for sensing touching force in response to a signal RS received from the same position (i.e. a first electrode among the plurality of first electrodes E1), regardless of sensing the touched position or sensing the touching force. This can consequently reduce the load of processing.

Regarding the touched position sensing function, the driver circuit 120 of the touch display device 100 according to exemplary embodiments can sense a touched position by sequentially driving the plurality of first electrodes E1 and then detecting a variation in capacitance between each of the plurality of first electrodes E1 and the pointer based on signals RS received from the plurality of first electrodes E1.

Regarding the touched position sensing function, the touch display device 100 according to exemplary embodiments can sense touching force by simultaneously driving the plurality of first electrodes E1 and the second electrodes E2.

In the touch display device 100 according to exemplary embodiments, the driver circuit 120 sequentially drives the plurality of first electrodes E1 by sequentially providing a first electrode driving signal DS1 to the plurality of first electrodes E1 to sense the touched position.

Herein, the first electrode driving signal DS1 provided to the plurality of first electrodes E1 to sense the touched position are also referred to as "touch driving signals (TDS)."

In addition, in the touch display device 100 according to exemplary embodiments, the driver circuit 120 simultaneously provides the first electrode driving signal DS1 to the plurality of first electrodes E1 and the second electrode driving signal DS2 to the second electrode E2 to sense the touching force, so that the plurality of first electrodes E1 and the second electrode E2 are driven simultaneously.

Herein, the first electrode driving signal DS1 provided to the plurality of first electrodes E1 to sense touching force are also referred to as a "first force driving signal FDS1," and the second electrode driving signal DS2 provided to the second electrode E2 to sense touching force is also referred to as a "second force driving signal FDS2."

In the touch display device 100 according to exemplary embodiments, the plurality of first electrodes E1 and the second electrode E2 are driven simultaneously to sense touching force, so both the plurality of first electrodes E1 disposed within the display panel 110 and the second electrode E2 located outside of the display panel 110 may be collectively referred to as "force sensors."

The plurality of first electrodes E1 not only operate as the touch sensors and the force sensors, but also operate as display driving electrodes to which display driving voltages are applied in a display mode section.

For example, the plurality of first electrodes E1 may be common electrodes to which a common voltage Vcom corresponding to a display driving voltage is applied during the display mode section.

When the plurality of first electrodes E1 are used as the display driving electrodes, the plurality of first electrodes E1 perform three roles as the touch sensors, the force sensors, and the display driving electrodes.

FIGS. 3 and 4 illustrate the sensing principle of the touch display device 100 according to exemplary embodiments.

FIG. 3 illustrates sensing operations according to three touch types (Case 1, Case 2, and Case 3) depending on types of pointer and whether or not touching force is applied, while FIG. 4 illustrates sensing principles according to the three touch types.

Referring to FIG. 3, touch types may include: Case 1, or a first touch type corresponding to a soft touch performed by applying an amount of pressing force equal to or less than a predetermined level using a pointer, the panel contact portion of which is made of a conductive material; Case 2, or a second touch type corresponding to a force touch performed by applying an amount of pressing force exceeding the predetermined level using the pointer, the panel contact portion of which is made of a conductive material; and Case 3, or a third touch type corresponding to a force touch performed by applying an amount of pressing force exceeding the predetermined level using a pointer, the panel contact portion of which is made of a nonconductive material.

Referring to FIGS. 3 and 4, in a touch mode section, the driver circuit 120 performs driving for sensing a touched position and touching force by sequentially providing a first electrode driving signal DS1 to the plurality of first electrodes E1 and providing a second electrode driving signal DS2 to the second electrode E2.

In response to the driving by the driver circuit 120 in the touch mode section, first capacitance C1 may be formed between a specific first electrode E1 among the plurality of first electrodes E1 and the pointer and second capacitance C2 may be formed between the specific first electrode E1 and the second electrode E2.

The first capacitance C1 formed between the specific first electrode E1 and the pointer may vary depending on whether or not a touch has been made.

The second capacitance C2 formed between the specific first electrode E1 and the second electrode E2 may vary depending on the presence (or amount) of touching force.

Thus, the driver circuit 120 can detect a change in the amount of the first capacitance C1 and a change in the amount of the second capacitance C2, based on signals received from the specific first electrode E1, can sense a touched position based on the change in the amount of the first capacitance C1, and can sense touching force based on the change in the amount of the second capacitance C2.

Referring to FIGS. 3 and 4, the touch display device 100 is configured to enable the touching force sensing function, such that capacitance can be formed between the specific first electrode E1 and the second electrode E2, and to form at least one gap G, the size of which is variable, depending on the amount of touching force applied to the display panel 110.

A force touch made at a specific point may change the size of the gap G for sensing vertical touching force, thereby changing the amount of the second capacitance C2 between the specific first electrode E1 and the second electrode E2. The changed amount of the second capacitance C2 can enable the touching force sensing function to sense an amount of touching force.

The at least one gap G present between the specific first electrode E1 and the second electrode E2 may be, for example, a dielectric gap or an air gap.

As described above, the gap G may have a shape (e.g. a dielectric gap or an air gap) suitable for the structure of the display panel 110 or the display device 100.

The result of touching force sensing may include information regarding whether or not touching force is present and information regarding the amount of the touching force.

As described above, the gap G structurally provided between the specific first electrode E1 and the second electrode E2 such that the size thereof is variable enables the touching force to be sensed.

The touch display device 100 according to exemplary embodiments can sense the touching force based on capacitance, in the same manner as when sensing a touched position (or touch coordinates).

In other words, the touch display device 100 according to exemplary embodiments is characterized by sensing the touching force (or pressing force) of a touch by a capacitance-based method using the second electrode E2 located outside of the display panel 110 to sense touching force and the plurality of first electrodes E1 disposed within the display panel 110 to calculate touch coordinates, unlikely from related art pressure sensing methods in which a dedicated pressure sensor is used alone.

As described above, the driver circuit 120 may sense different pieces of information depending on touch types even in the case in which the plurality of first electrodes E1 and the second electrodes E2 are driven in the same manner in a touch mode section.

For example, referring to Case 1 illustrated in FIGS. 3 and 4, when a touch is the first touch type corresponding to a soft touch performed by applying an amount of pressing force equal to or less than a predetermined level using a pointer, the panel contact portion of which is made of a conductive material, the driver circuit 120 can sense only the touched position of the touch based on signals RS received from the plurality of first electrodes E1 after driving the plurality of first electrodes E1 and the second electrode E2.

This indicates that, when the touch is the first touch type corresponding to the soft touch performed by applying an amount pressing force equal to or less than a predetermined level using the pointer, the contact portion of which is made of a conductive material, the amount of the first capacitance C1 between the specific first electrode E1 and the pointer has changed, but the amount of the second capacitance C2 between the specific first electrode E1 and the second electrode E2 has not changed, so that the touched position can be sensed selectively.

In another example, referring to Case 2 illustrated in FIGS. 3 and 4, when a touch is the second touch type corresponding to a force touch performed by applying an amount of pressing force exceeding the predetermined level using the pointer, the panel contact portion of which is made of a conductive material, the driver circuit 120 can sense both the touched position and the touching force of the touch based on signals RS received from the plurality of first electrodes E1.

This indicates that, when the touch is the second touch type corresponding to a force touch performed by applying an amount of pressing force exceeding the predetermined level using the pointer, the panel contact portion of which is made of a conductive material, both the amount of the first capacitance C1 between the specific first electrode E1 and the pointer and the amount of the second capacitance C2 between the specific first electrode E1 and the second electrode E2 have changed, so that both the touched position and the touching force of the single touch can be sensed.

In a further example, referring to Case 3 illustrated in FIGS. 3 and 4, when a touch is the third touch type corresponding to a force touch performed by applying an amount of pressing force exceeding the predetermined level using a pointer, the panel contact portion of which is made of a nonconductive material, the driver circuit 120 can selectively detect the touching force of the touch based on signals received from the plurality of first electrodes E1.

This indicates that, when the touch is the third touch type corresponding to a force touch performed by applying an amount of pressing force exceeding the predetermined level using the pointer, the panel contact portion of which is made of a nonconductive material, no first capacitance C1 is formed between the specific first electrode E1 and the pointer but the amount of the second capacitance C2 between the specific first electrode E1 and the second electrode E2 has changed, so that the touching force of the single touch can be sensed selectively.

As described above, the touch display device 100 has the gap structure between the plurality of first electrodes E1 and the second electrode E2 and performs the sensing process based on signals received from the plurality of first electrodes E1. Thus, sensing information according to the touch type can be obtained, even in the case in which the plurality of first electrodes E1 and the second electrode E2 are driven in the same manner and the signal detection process and the sensing process are performed in the same manner, regardless of the touch type, during the touch mode section.

Hereinafter, the first electrode driving signal DS1 and the second electrode driving signal DS2 for touch driving during the touch mode section will be described.

The first electrode driving signal DS1 provided to the plurality of first electrodes E1 during the touch mode section may be regarded as a touch driving signal in terms of the touch sensing function of sensing a touched position, as well as a force driving signal in terms of the force sensing function of sensing touching force.

The second electrode driving signal DS2 provided to the second electrode E2 during the touch mode section may be regarded as a force driving signal in terms of the force sensing function of sensing touching force.

During the touch mode section in which the touch display device 100 according to exemplary embodiments operates in the touch mode, a touched position and touching force may be sensed simultaneously. Alternatively, a touched position and touching force may be sensed independently of each other in different sections.

Figure 5:
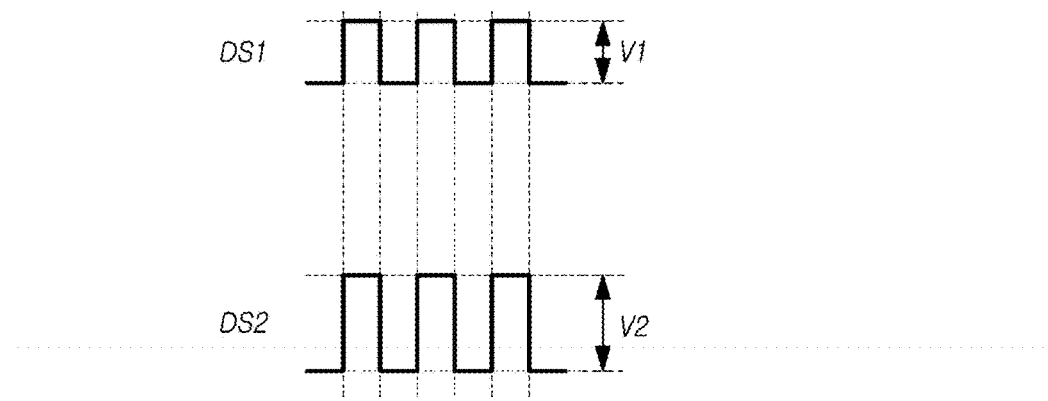
FIG. 5 is a waveform diagram illustrating a first electrode driving signal and a second electrode driving signal in phase with each other in the touch display device according to exemplary embodiments.
Figure 6:
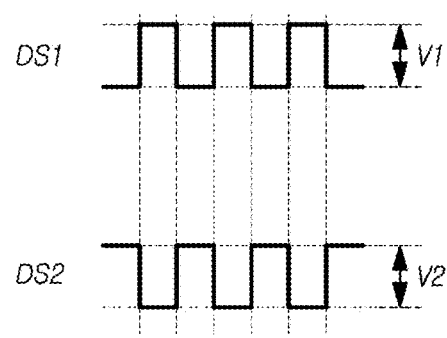
FIG. 6 is a waveform diagram illustrating a first electrode driving signal and a second electrode driving signal in antiphase with each other in the touch display device according to exemplary embodiments.

FIG. 5 is a waveform diagram illustrating a first electrode driving signal DS1 and a second electrode driving signal DS2 in phase with each other in the touch display device 100 according to exemplary embodiments, and FIG. 6 is a waveform diagram illustrating a first electrode driving signal DS1 and a second electrode driving signal DS2 in antiphase with each other in the touch display device 100 according to exemplary embodiments.

Referring to FIGS. 5 and 6, the first electrode driving signal DS1 and the second electrode driving signal DS2 have the same frequency.

However, the phase of the first electrode driving signal DS1 and the phase of the second electrode driving signal DS2 may be the same as illustrated in FIG. 5 or may be different from each other as illustrated in FIG. 6.

Referring to FIG. 5, when the first electrode driving signal DS1 and the second electrode driving signal DS2 are in phase with each other, the phase of the first electrode driving signal DS1 and the phase of the second electrode driving signal DS2 are the same.

Referring to FIG. 6, when the first electrode driving signal DS1 and the second electrode driving signal DS2 are in antiphase with each other, the phase of the first electrode driving signal DS1 and the phase of the second electrode driving signal DS2 may have a phase difference of 180 degrees.

The first electrode driving signal DS1 has an amplitude corresponding to V1 voltage, while the second electrode driving signal DS2 has an amplitude corresponding to V2 voltage.

As illustrated in FIG. 5, when the first electrode driving signal DS1 and the second electrode driving signal DS2 are in phase with each other, the amplitude V2 of the second electrode driving signal DS2 may be greater than the amplitude V1 of the first electrode driving signal DS1.

Figure 7:
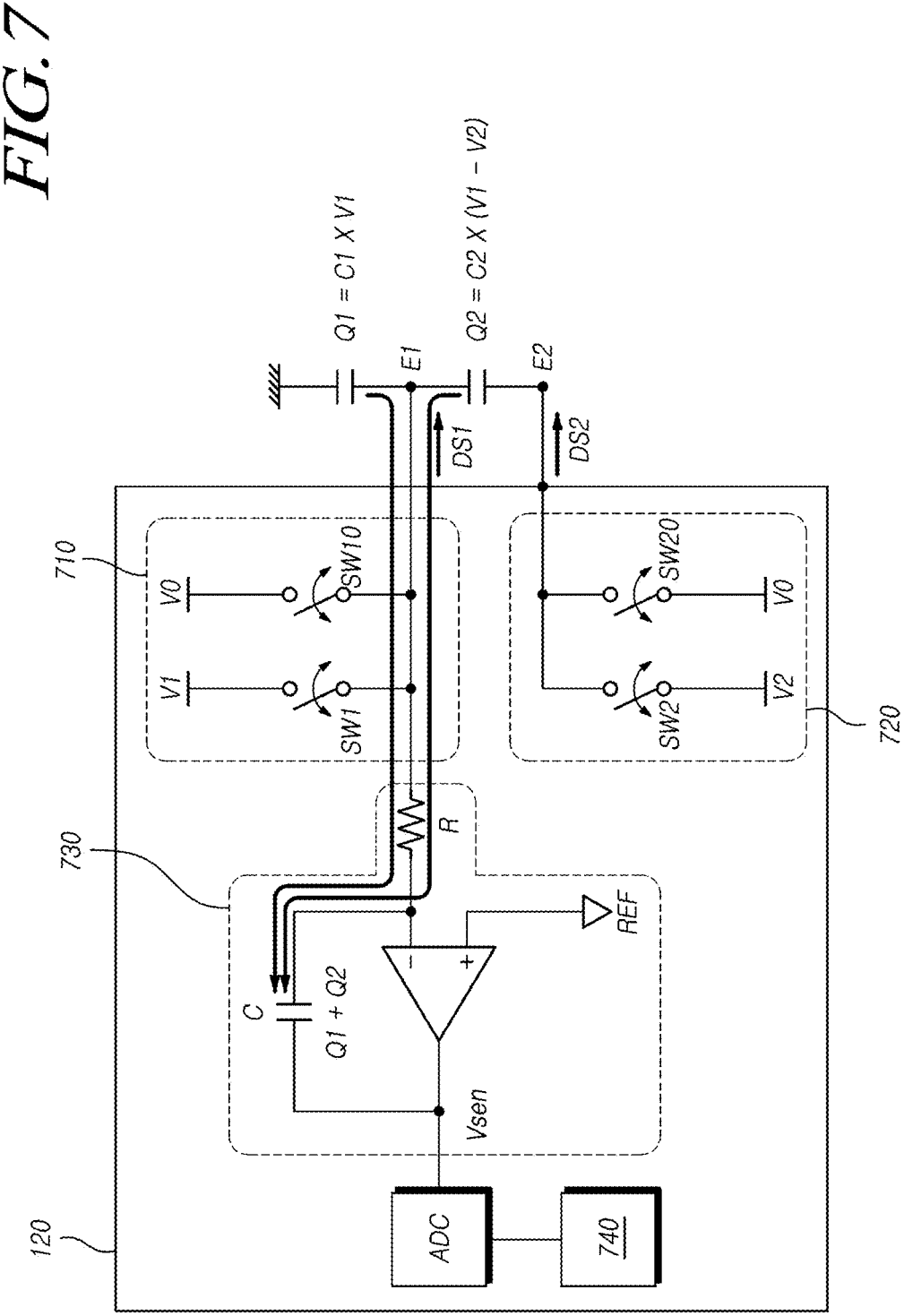
FIG. 7 is a circuit diagram illustrating the driver circuit of the touch display device according to exemplary embodiments.

FIG. 7 is a circuit diagram illustrating the driver circuit 120 of the touch display device 100 according to exemplary embodiments.

As illustrated in FIG. 7, the driver circuit 120 includes a first electrode driving signal provider 710, a second electrode driving signal provider 720, and an integrator 730.

The first electrode driving signal provider 710 provides a first electrode driving signal DS1 having a signal waveform from among the signal waveforms illustrated in FIG. 5 to a first electrode E1 by on/off controlling of two switches SW1 and SW10.

The second electrode driving signal provider 720 provides a second electrode driving signal DS2 having a signal waveform from among the signal waveforms illustrated in FIG. 6 to a second electrode E2 by on/off controlling of the two switches SW1 and SW10.

The integrator 730 includes an operation amplifier OP-AMP, a capacitor C, and a resistor R. The integrator 730 produces an integrated value based on an input value of an input point electrically connected to the first electrode E1.

The driver circuit 120 further includes an analog-to-digital converter ADC converting the value output by the integrator 730 into a digital value, a processor 740 calculating a touched position and recognizing touching force based on the digital value output by the analog-to-digital converter ADC, and the like.

At least one of the analog-to-digital converter ADC and the processor 740 may be disposed outside of the driver circuit 120.

The circuit configuration of the driver circuit 120 illustrated in FIG. 7 is only illustrative for the sake of explanation, and the driver circuit 120 may be embodied in a variety of other forms.

Referring to FIG. 7, when the driver circuit 120 operates in the touch mode section, the driver circuit 120 provides the first electrode driving signal DS1 to the first electrode E1 and the second electrode driving signal DS2 to the second electrode E2. Thereafter, the driver circuit 120 produces an integrated value Vsen by integrating a signal received from the first electrode E1 using the integrator 730 and then converts the integrated value Vsen into a digital value.

Then, the driver circuit 120 can sense at least one of a touched position and touching force by determining a charge level (or a voltage) or a change thereof depending on whether or not a touch has been made, the presence of touching force, and the like, based on the digital value of each of the plurality of first electrodes E1.

Referring to FIG. 7, a signal received from the first electrode E1 (i.e. an input by the integrator 830) corresponds to a total amount of charges Q1+Q2, where Q1 indicates the amount of charge charged in a capacitor C1 between the pointer and the first electrode E1, and Q2 indicates the amount of charge charged in a capacitor C2 between the first electrode E1 and the second electrode E2.

In response to driving in the touch mode section, the amount of charge Q1 charged in the capacitor between the pointer and the first electrode E1 can be determined by the first capacitance C1 and the voltage V1 of the first electrode driving signal DS1. The amount of charge Q2 charged in the capacitor between the first electrode E1 and the electrode E2 can be determined by the second capacitance C2, the voltage V1 of the first electrode driving signal DS1, and the voltage V2 of the second electrode driving signal DS2.

The amount of charge Q1 charged in the capacitor between the pointer and the first electrode E1 and the amount of charge Q2 charged in the capacitor between the first electrode E1 and the electrode E2 are represented by Formula 1.

$$Q1 = C1 \times V1$$

$$Q2 = C2 \times (V1 - V2) \qquad \text{[Formula 1]}$$

The total amount of changes Q1+Q2 is charged in the capacitor C within the integrator 830 and is output as a sensed voltage value Vsen by the integrator 830.

Thus, the analog-to-digital converter ADC converts the sensed voltage value Vsen into a digital value.

The processor 740 can sense at least one of a touched position and touching force, based on the digital value (or sensed value) output by the analog-to-digital converter ADC.

When the touching force is sensed, an application or a function, previously set to correspond to the touching force, can be performed.

Alternatively, when the touching force is sensed, an application or a function, previously set to correspond to the amount of touching force, can be performed.

Figure 8:
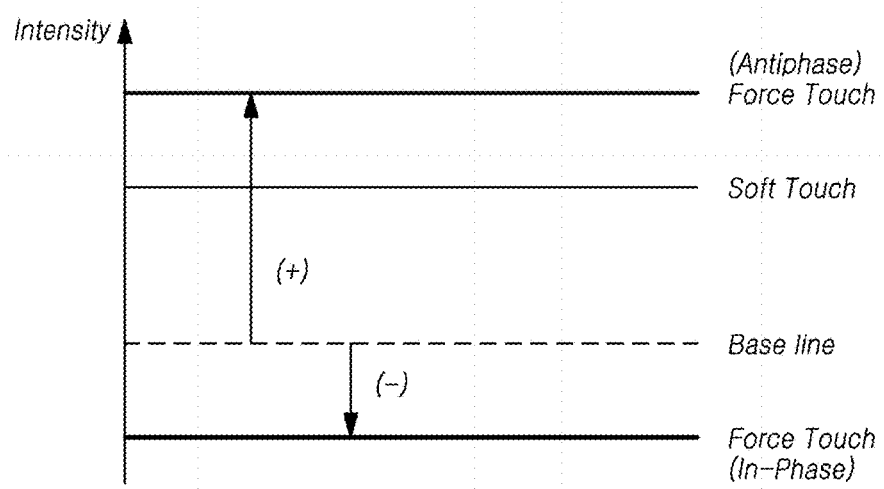
FIG. 8 illustrates the intensity of an incoming signal in response to a soft touch and the intensity of an incoming single in response to a force touch in the touch display device according to exemplary embodiments.

FIG. 8 illustrates the intensity of an incoming signal in response to a soft touch and the intensity of an incoming single in response to a force touch in the touch display device 100 according to exemplary embodiments.

In FIG. 8, a case in which a first electrode driving signal DS1 and a second electrode driving signal DS2 are pulse signals is taken, as in FIGS. 6A and 6B.

Referring to FIG. 8, the intensity of a signal received from a first electrode E1 may be determined as a digital value output by the analog-to-digital converter ADC.

Referring to FIG. 8, when a soft touch is made by an amount of pressing force equal to or less than a predetermined level, a digital value output by the analog-to-digital converter ADC is a positive (+) value with respect to a digital value (baseline) output by the analog-to-digital converter ADC when no touch has been made.

Referring to FIG. 8, in the case in which the first electrode driving signal DS1 and the second electrode driving signal DS2 are in phase with each other, when a force touch is made by applying an amount of pressing force exceeding the predetermined level using a pointer, the contact portion of which is made of a nonconductive material, a digital value output by the analog-to-digital converter ADC is a negative (−) value with respect to the baseline.

Referring to FIG. 8, in the case in which the first electrode driving signal DS1 and the second electrode driving signal DS2 are in antiphase with each other, when a force touch is made by applying an amount of pressing force exceeding the predetermined level using the pointer, the contact portion of which is made of a nonconductive material, a digital value output by the analog-to-digital converter ADC is a positive (+) value with respect to the baseline.

Figure 9A:
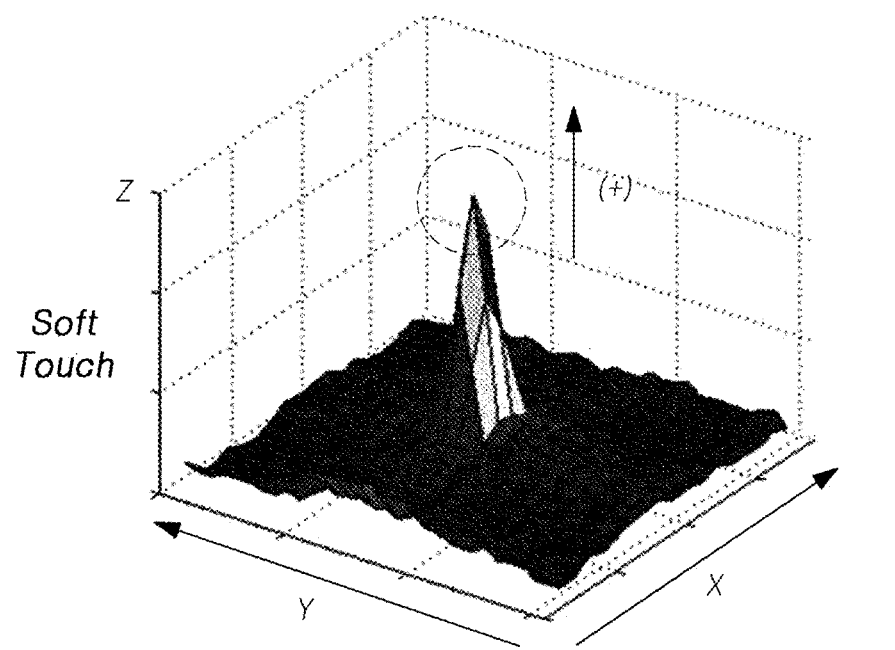
FIGS. 9A and 9B are graphs illustrating the signal intensity distributions of signals received in response to a soft touch and a force touch in the touch display device according to exemplary embodiments.
Figure 9B:
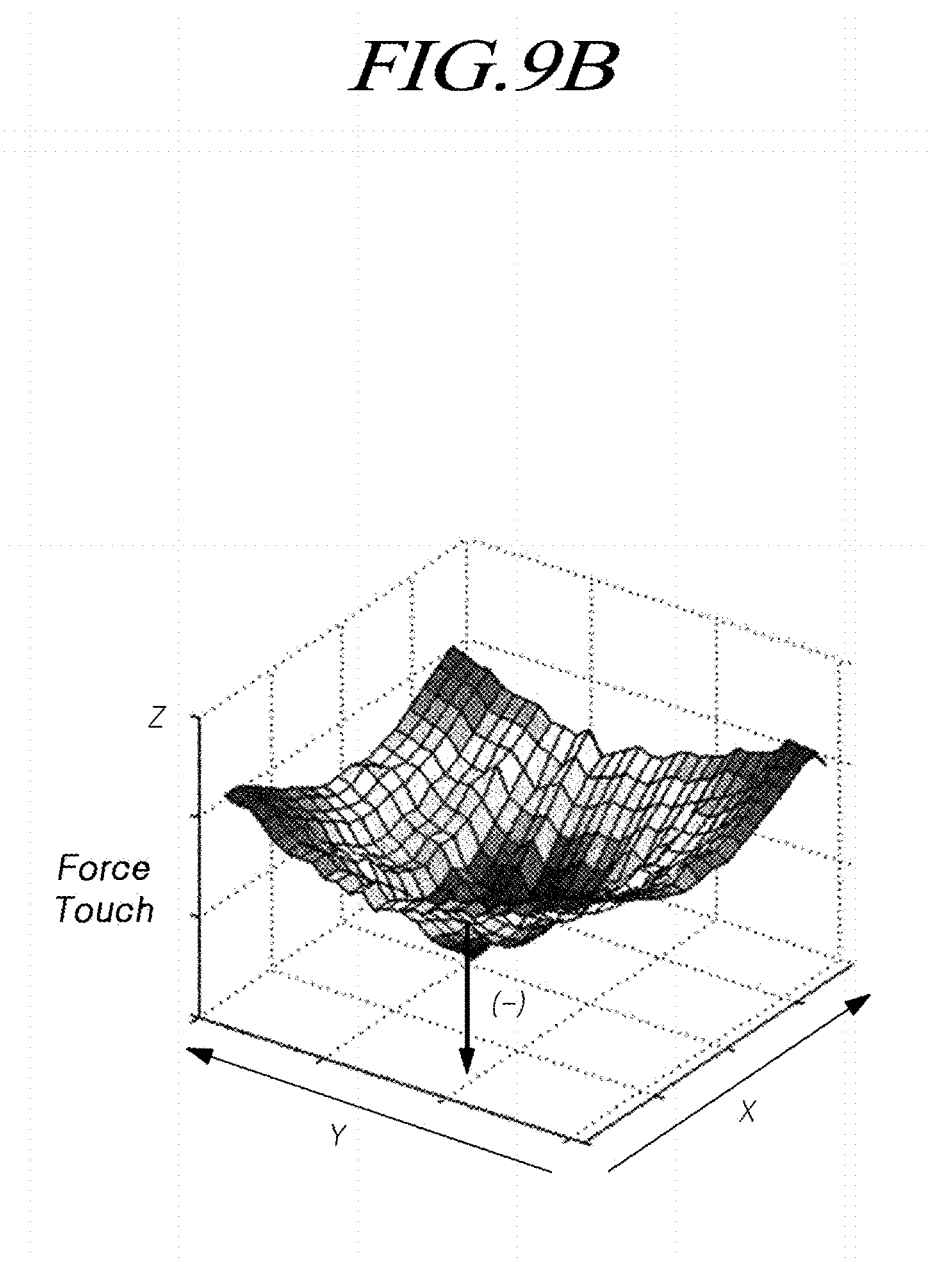

FIGS. 9A and 9B are graphs illustrating the signal intensity distributions of signals received in response to a soft touch and a force touch in the touch display device 100 according to exemplary embodiments.

FIGS. 9A and 9B illustrate the signal intensity distributions over the entire area (i.e. the X-Y plane) of the display panel 110 of the touch display device 100 according to exemplary embodiments when the signals are received in response to the soft touch and the force touch.

Referring to FIG. 9A, regarding the entire area of the display panel 110, when a soft touch is made at specific points, the sizes (or signal intensities) of digital values output by the analog-to-digital converter ADC are distributed such that the signal intensities generally increase in the positive (+) direction of the z-axis with respect to the baseline.

Regarding the signal intensity distribution in the case in which the soft touch is made, higher signal intensities may be concentrically distributed at the points in the entire screen area (i.e. the entire area of the display panel 110) where the soft touch is made.

Referring to FIG. 9B, when a force touch is made in a case in which the second electrode E2 is a single electrode plate, the sizes (or signal intensities) of digital values output by the analog-to-digital converter ADC are distributed such that the signal intensities generally increase in the negative (−) direction of the z-axis with respect to the baseline.

When the force touch is made, the signal intensities are distributed such that the signal intensities gradually increase from the periphery toward the center of the screen, with a highest signal intensity in the negative (−) direction being located at the central point of the screen.

Increases in the strength of the force touch may increase changes in the size of the gap G between the plurality of first electrodes E1 and the second electrode E2. Consequently, digital values output by the analog-to-digital converter ADC increase in the negative (−) direction of the z-axis with respect to the baseline. The stronger the force touch is, the higher the signal intensity becomes.

Figure 10:
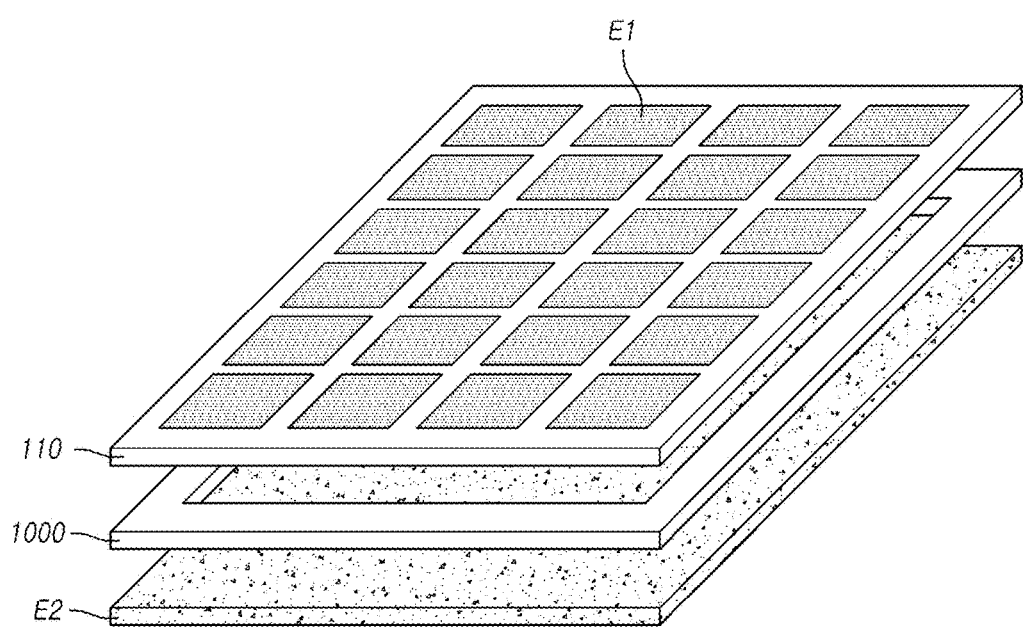
FIGS. 10 and 11 are perspective views schematically illustrating the touch display device according to exemplary embodiments.
Figure 11:
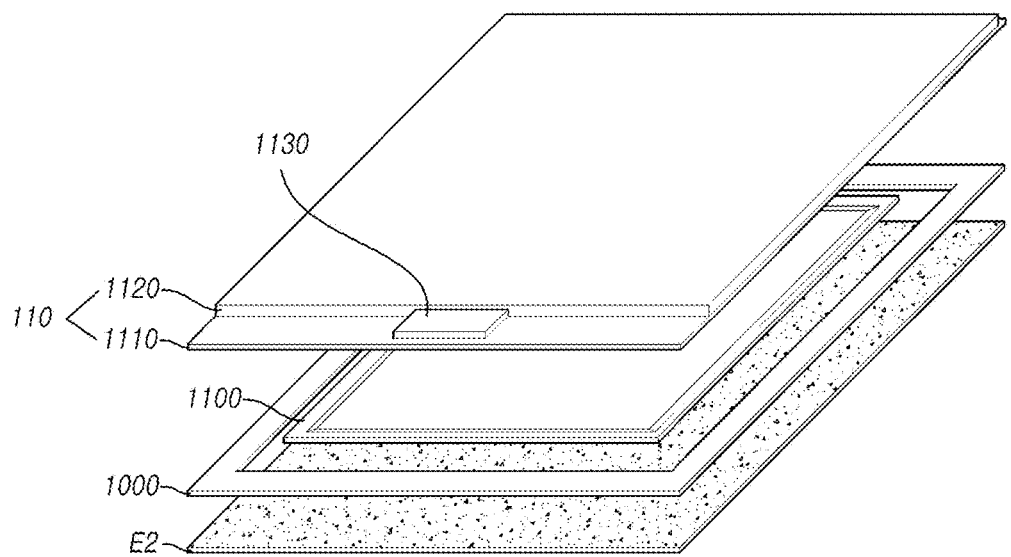

FIGS. 10 and 11 are perspective views schematically illustrating the touch display device 100 according to exemplary embodiments.

Referring to FIG. 10, the touch display device 100 according to exemplary embodiments includes a plurality of first electrodes E1 disposed in a display panel 110 and a second electrode E2 disposed outside of the display panel 110.

A gap G, the size of which is changeable in response to a force touch, must be formed between the plurality of first electrodes E1 and the second electrode E2, such that force sensing is enabled.

The touch display device 100 according to exemplary embodiments includes a gap structure unit 1000 to change the size of the gap G between plurality of first electrodes E1 and the second electrode E2 when a force touch is made. The gap structure unit 1000 forms the gap G between the plurality of first electrodes E1 and the second electrode E2 such that the size of the gap G is changeable in response to the force touch.

The gap structure unit 1000 is located, for example, below the display panel 110 to support the bottom of the periphery of the display panel 110.

The gap structure unit 1000 allows the size of the gap G between the plurality of first electrodes E1 and the second electrode E2 to change, so that touching force can be sensed.

Referring to FIG. 11, in the touch display device 100 according to exemplary embodiments, the display panel 110 includes a first substrate 1110 on which thin-film transistors (TFTs) are disposed and a second substrate 1120 on which color filters (CFs) are disposed.

A driver chip 1130 may be mounted on, bonded to, or connected to a peripheral portion (or a non-active area) of the first substrate 1110.

The driver chip 1130 may be a chip in which the entirety or a portion of the driver circuit 120 are embodied, a data driver chip, or in some cases, a display driver chip including the entirety or portions of a data driver circuit and the driver circuit 120.

Referring to FIG. 11, a lower structure 1100 is located below the display panel 110.

The second electrode E2 may be located below or within the gap structure unit 1000.

The lower structure 1100 may be, for example, a backlight unit of a liquid crystal display (LCD) device. In this case, the second electrode E2 may be located below the backlight unit.

Thus, the second electrode E2 can be disposed without interrupting the light irradiating function of the backlight unit.

The gap structure unit 1000 may be located below, within, or on a side of the lower structure 1100.

The second electrode E2 may be located below or within the gap structure unit 1000.

As described above, the second electrode E2 or the gap structure unit 1000 can be designed to be provided in various positions. Thus, a touching force sensing structure suitable for the design structures of the display panel 110 and the touch display device 100 can be realized.

Hereinafter, the touch display device 100 according to exemplary embodiments will be regarded as an LCD device, for the sake of explanation, in the description of various embodiments of the gap structure unit 100 that can be employed in an LCD device. Accordingly, the positions of the plurality of first electrodes E1 and the second electrode E2 of the touch display device 100 will be described first.

Figure 12:
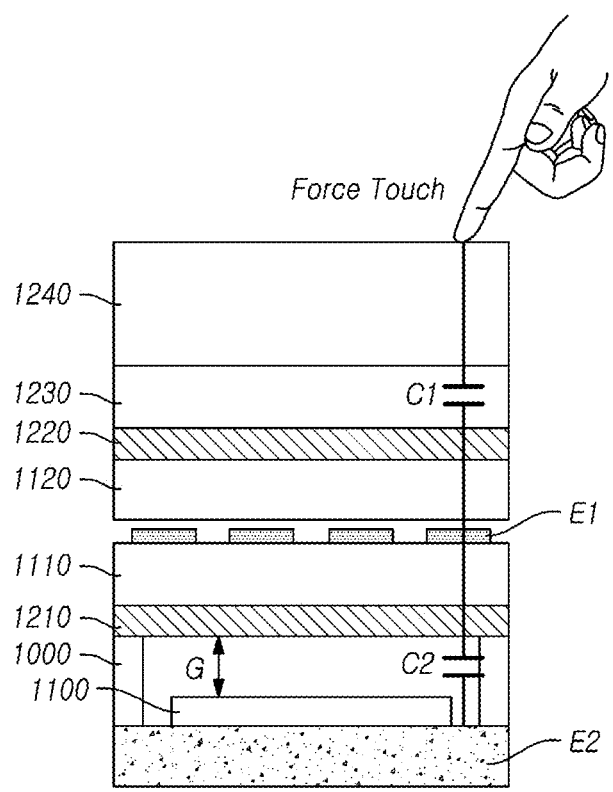
FIG. 12 is a cross-sectional view illustrating the touch display device according to exemplary embodiments.
Figure 13:
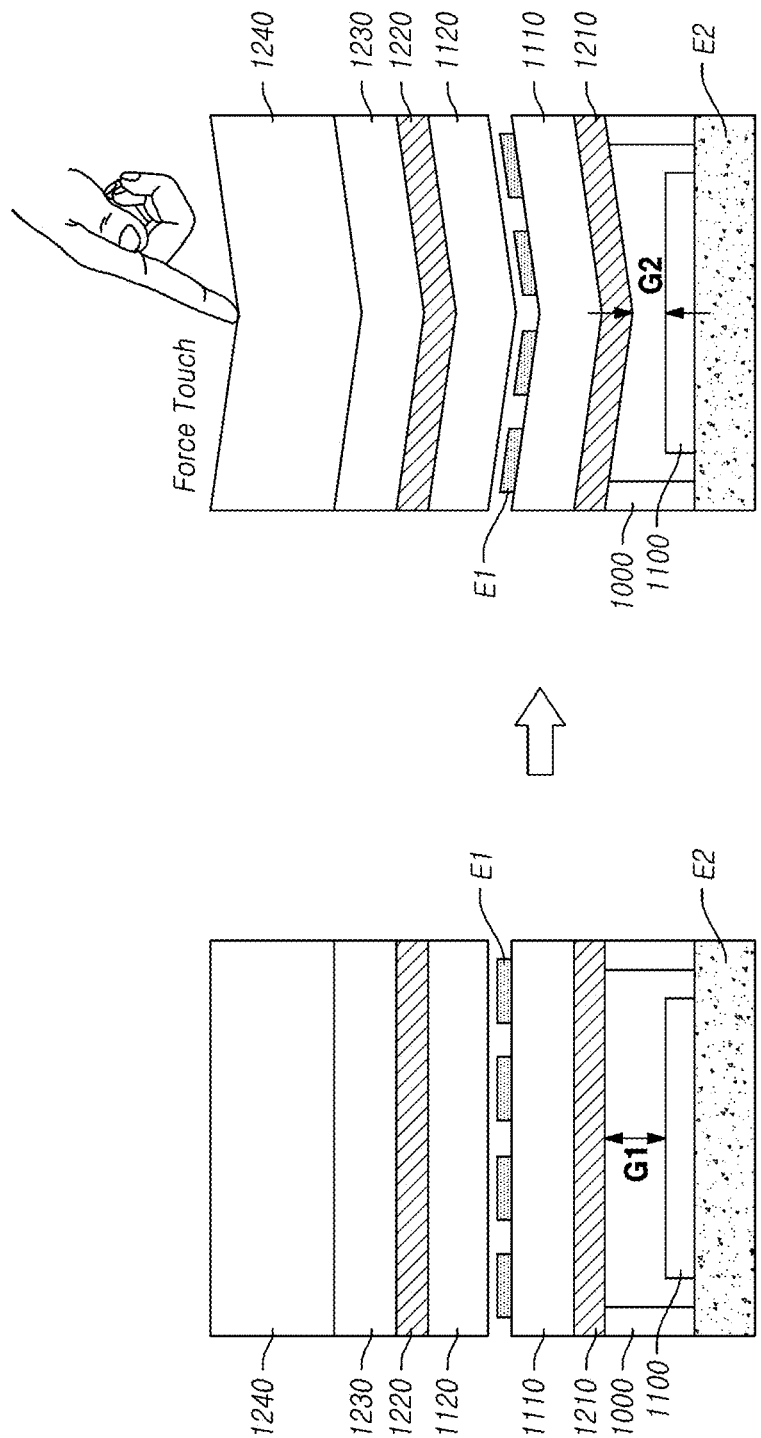
FIG. 13 is a cross-sectional view illustrating a change in the size of the gap by a force touch in the touch display device according to exemplary embodiments.

FIG. 12 is a cross-sectional view illustrating the touch display device 100 according to exemplary embodiments, while FIG. 13 is a cross-sectional view illustrating a change in the size of the gap by a force touch in the touch display device 100 according to exemplary embodiments.

Referring to FIG. 12, the display panel 110 includes a first polarization plate 1210, a first substrate 1110, a plurality of first electrodes E1, a second substrate 1120, and a second polarization plate 1220.

A bonding layer 1230 and a top cover 1240 are disposed on top of the display panel 110.

A lower structure 110 is located below the display panel 110.

The lower structure 1100 may be a structure previously provided in the touch display device 100 or a structure separately provided for the second electrode E2.

For example, the lower structure 1100 may be a backlight unit or a rear cover of the LCD device. In addition, the lower structure 1100 may be any structure that does not interfere with electric fields generated by the plurality of first electrodes E1 such that capacitance can be formed between each of the plurality of first electrodes E1 and the second electrode E2.

Since the second electrode E2 is located below or within the lower structure 1100, corresponding to the backlight unit as described above, a force sensing structure suitable for an LCD device can be realized.

In the case of an LCD device, it is necessary to exclude any material (e.g. a material layer, a reflector, or a transparent electrode made of Ag or the like) interrupting the formation of the second capacitance C2 between the plurality of first electrodes E1 and the second electrode E2.

Referring to FIG. 13, when a force touch is made, the top cover 1240, the display panel 110, and the like are bent slightly downward.

This may consequently change the size of the gap G, such as an air gap or a dielectric gap, provided between the plurality of first electrodes E1 and the second electrode E2.

When the gap G prior to the force touch is designated as G1 and the gap G after the force touch is designated as G2, G2 is reduced to be smaller than G1 by the touching force.

As the gap G is reduced from G1 to G2 in response to the force touch, the second capacitance C2 is changed, thereby allowing the force touch to be recognized.

FIG. 14 illustrates two driving types (i.e. driving type A and driving type B) of the touch display device 100 according to exemplary embodiments in a touch mode section TM of two operation mode sections DM and TM.

Referring to FIG. 14, the touch display device 100 according to exemplary embodiments can operate in "display mode" to display images as well as in "touch mode" to sense at least one of a touched position and touching force.

Referring to FIG. 14, the display mode section DM and the touch mode section TM may be undertaken by being time-divided.

For example, the touch display device 100 can operate alternately in the display mode and the touch mode in a single frame section by dividing the single frame section into a single display mode section DM and a single touch mode section TM by time division. In this case, the display mode section DM may be present alone in a specific frame section.

In another example, the touch display device 100 can operate alternately in the display mode and the touch mode in a single frame section by dividing the single frame section into one or more display mode section DM and two or more touch mode sections TM by time division.

As described above, the driver circuit 120 of the touch display device 100 can sense a touch position and touching force during the touch mode section TM.

In this regard, the driver circuit 120 may drive the plurality of first electrodes E1 or both the plurality of first electrodes E1 and at least one second electrode E2.

During the touch mode section TM, the driver circuit 120 can drive the plurality of first electrodes E1 and the at least one second electrode E2 using one of two driving methods.

Referring to FIG. 14, the two driving methods include (1) a simultaneous driving method (driving type A) in which driving for sensing a touched position and driving for sensing touching force are performed simultaneously and (2) a separate driving method (driving type B) in which the driving for sensing a touched position and the driving for sensing touching force are performed separately.

In the case of the simultaneous driving method corresponding to driving type A, during each touch mode section TM, the second electrode E2 is driven while at least one second electrode among the plurality of first electrodes E1 is being driven sequentially (i.e. driving for sensing a touched position and driving for sensing touching force are performed simultaneously). Based on the result of driving during one or more touch mode section TM, both the touched position and the touching force can be sensed.

In the case of the separate driving method corresponding to driving type B, the single touch mode section TM includes at least one of a touch driving section TD and a force driving section FD.

For example, each touch mode section TM may include at least one touch driving section TD and at least one force driving section FD.

In addition, each touch mode section TM may include at least one touch driving section TD or at least one force driving section FD.

The touch mode section TM and the force driving section FD may not be temporally adjacent to each other. The display mode section DM may be located between the touch driving section TD and the force driving section FD.

Figure 15:
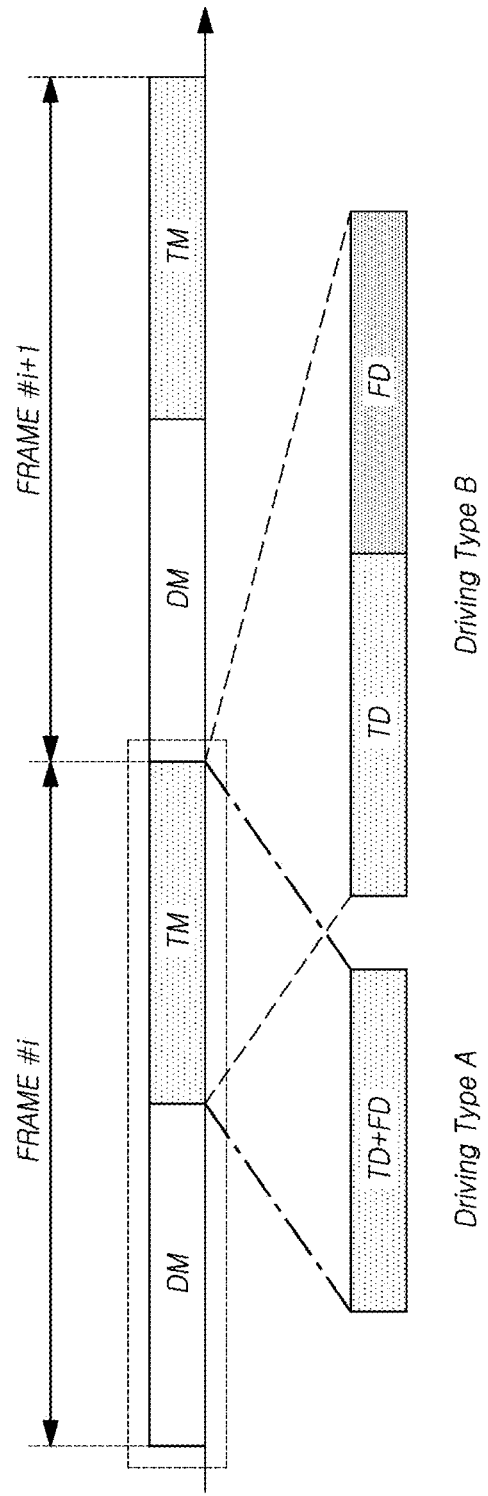
FIGS. 15 and 16 illustrate examples of allocating display mode sections and touch mode sections in the touch display device according to exemplary embodiments.
Figure 16:
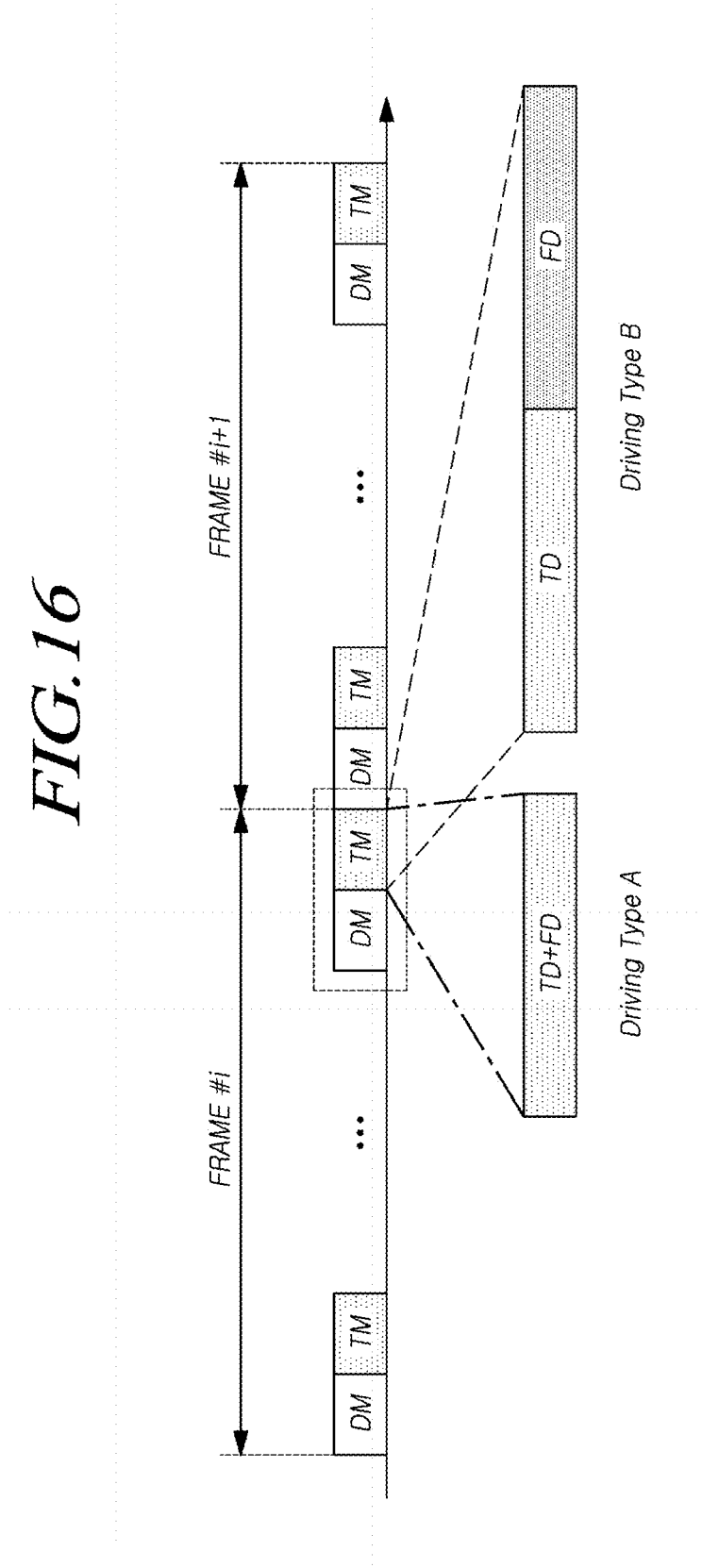

FIGS. 15 and 16 illustrate examples of allocating display mode sections DM and touch mode sections TM during two consecutive frame sections FRAME #i and FRAME #i+1 in the touch display device 100 according to exemplary embodiments.

Referring to FIG. 15, a single display mode section DM and a single touch mode section TM is allocated in a single frame section.

In this case, in the single display mode section DM, gate driving and data driving over the entire area of the display panel 110 can be performed.

In the single touch mode section TM, a touched position and touching force may be sensed after the plurality of first electrodes E1 disposed in the display panel 110 are driven sequentially.

In the case of the simultaneous driving method corresponding to driving type A, during each touch mode section TM, the driver circuit 120 can perform simultaneous driving TD+FD to sense both a touched position and touching force.

In the case of a separate driving method corresponding to driving type B, the touch mode section TM is time-divided into the touch driving section TD for sensing a touched position and the force driving section FD for sensing touching force.

Thus, the driver circuit 120 can sequentially drive the plurality of first electrodes E1 to sense a touched position during the touch driving section TD. The driver circuit 120 can sense touching force by sequentially or simultaneously driving at least one first electrode among the plurality of first electrodes E1 during the force driving section FD, and while each of the plurality of first electrodes E1 is being driven, simultaneously driving the second electrode E2.

Referring to FIG. 16, two or more display mode sections DM and two or more touch mode sections TM may be allocated in a single frame section.

In this case, in a single display mode section DM, gate driving and data driving are performed on a portion of the area of the display panel 110. When all display mode sections DM in a single frame section are undertaken, gate driving and data driving can be performed on the entire area of the display panel 110.

In addition, in a single touch mode section TM, specific first electrodes among the plurality of first electrodes E1 disposed in the display panel 110 are driven sequentially or simultaneously.

When all of the touch mode sections TM in the single frame section are undertaken, all of the plurality of first electrodes E1 disposed in the display panel 110 are driven, so that a touched position and touching force can be sensed.

In the case of the simultaneous driving method corresponding to driving type A, the driver circuit 120 can perform simultaneous driving (TD+FD) to simultaneously sense a touched position and touching force during each touch mode section TM.

In the case of the separate driving method corresponding to driving type B, each touch mode section TM is time-divided into a touch driving section TD for sensing a touched position and a force driving section FD for sensing touching force.

Accordingly, the driver circuit 120 can sense a touched position by sequentially driving the plurality of first electrodes E1 during all touch driving sections TD in a single frame section. At the same time, in the single frame section, the driver circuit 120 can sense touching force by sequentially or simultaneously driving at least one first electrode among the plurality of first electrodes E1 during all force driving sections FD, and while each of the plurality of first electrodes E1 is being driven, simultaneously driving the second electrode E2.

Figure 17:
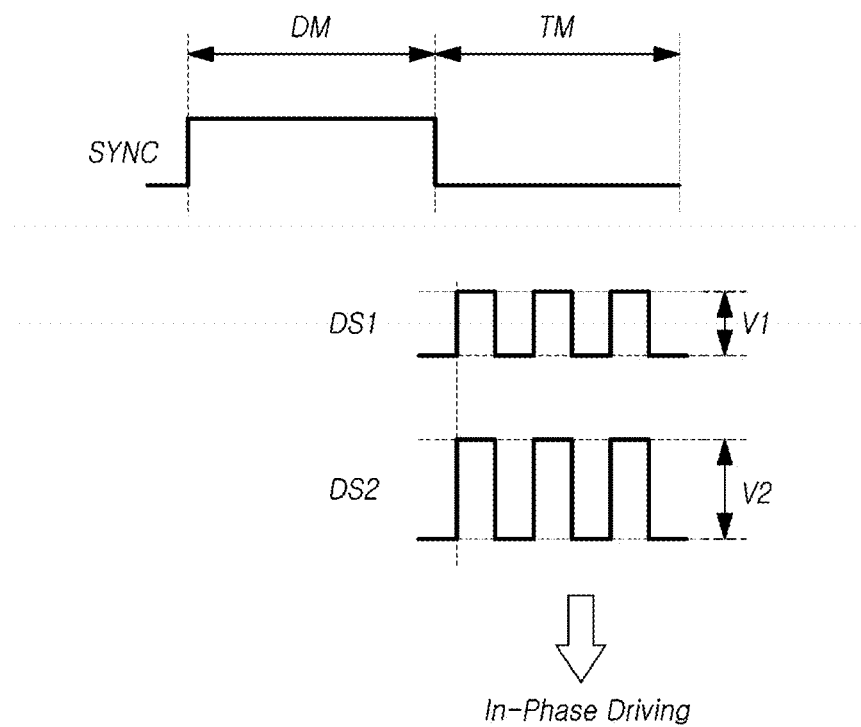
FIG. 17 illustrates a first electrode driving signal and a second electrode driving signal when the touch display device according to exemplary embodiments performs in-phase driving in a touch mode section.
Figure 18:
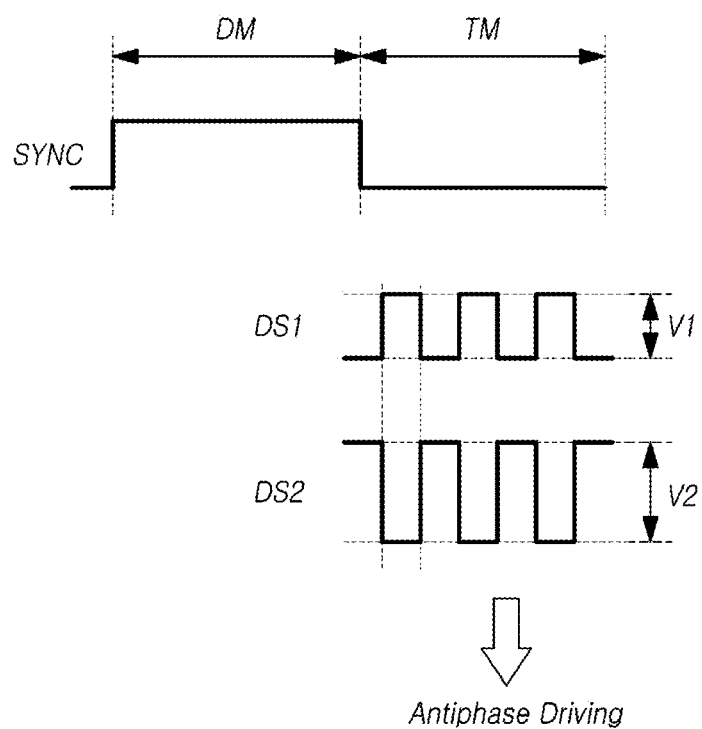
FIG. 18 illustrates a first electrode driving signal and a second electrode driving signal when the touch display device according to exemplary embodiments performs anti-phase driving in a touch mode section.

FIG. 17 illustrates a first electrode driving signal and a second electrode driving signal when the touch display device 100 according to exemplary embodiments performs in-phase driving in a touch mode section, while FIG. 18 illustrates a first electrode driving signal and a second electrode driving signal when the touch display device 100 according to exemplary embodiments performs antiphase driving in a touch mode section.

Referring to FIGS. 17 and 18, a display mode section DM and a touch mode section TM may be defined by a synchronization signal SYNC.

For example, when the synchronization signal SYNC is a high (or low) level signal, the operation mode section of the touch display device 100 corresponds to the display mode section DM. When the synchronization signal SYNC is a low (or high) level signal, the operation mode section of the touch display device 100 corresponds to the touch mode section TM.

The synchronization signal SYNC may be a control signal provided to the driver circuit 120 by a timing controller (not shown).

A first electrode driving signal DS1 provided to the plurality of first electrodes E1 and the second electrode driving signal DS2 provided to a second electrode E2 for the touching force sensing function during the touch mode section TM defined by the synchronization signal SYNC may have the same phase (in phase) as illustrated in FIG. 17 or may have a phase difference of 180 degrees as illustrated in FIG. 18.

During the touch mode section TM, the driver circuit 120 simultaneously drives the plurality of first electrodes E1 and the second electrode E2 to sense touching force, produces information regarding a touched position (i.e. touched position-related information regarding at least one of the occurrence of a touch and a touched position) using sensing data obtained based on signals RS received from the plurality of first electrodes E1, and produces information regarding touching force (i.e. touching force-related information regarding at least one of the presence of touching force, the amount of the touching force, and a touching force level).

In the sensing data obtained based on the signals RS received from the plurality of first electrodes E1, components regarding the touched position and components regarding the touching force are mixed.

Thus, when the driver circuit 120 uses the sensing data obtained by driving the plurality of first electrodes E1 and the second electrode E2 using the first electrode driving signal DS1 and the second electrode driving signal DS2 in phase or antiphase with the first electrode driving signal DS1 during the touch mode section TM, touch-related information is not accurately produced.

Here, the touch-related information may include the touched position-related information regarding at least one of the occurrence of a touch and a touched position and the touching force-related information regarding at least one of the presence of touching force, the amount of the touching force, and a touching force level.

The touch display device 100 according to exemplary embodiments provides an alternate driving method of alternately performing in-phase driving using in-phase signals, including a first electrode driving signal DS1 and a second electrode driving signal DS2 in phase with the first electrode driving signal DS1, and antiphase driving using antiphase signals, including a first electrode driving signal DS1 and a second electrode driving signal DS2 in antiphase with the first electrode driving signal DS1, to accurately produce the touch-related information, i.e. to accurately produce the touched position-related information regarding at least one of the occurrence of a touch and a touched position and the touching force-related information regarding at least one of the presence of touching force, the amount of the touching force, and a touching force level.

Figure 19:
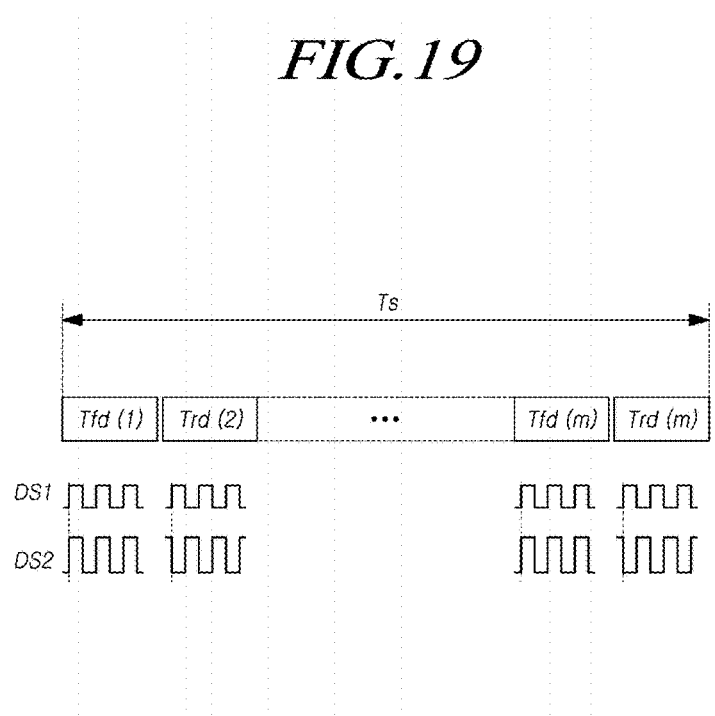
FIG. 19 illustrates alternate driving performed by the touch display device according to exemplary embodiments to sense touch-related information.

FIG. 19 illustrates alternate driving performed by the touch display device 100 according to exemplary embodiments to sense touch-related information.

In the case of the simultaneous driving method, the touch display device 100 according to exemplary embodiments can sense at least one of a touched position and touching force by producing touch-related information using sensing data obtained based on signals RS received from a plurality of first electrodes E1 by sequentially or simultaneously driving a plurality of first electrodes E1 and driving a second electrode during each touch mode section TM.

The produced touch-related information may include at least one of touched position-related information regarding at least one of the occurrence of a touch and a touched position and touch force-related information regarding at least one of the presence of touching force, the amount of touching force, and a touching force level.

Information included in the touch-related information may vary depending on the presence of touching force, pointer types, and the like.

When a user makes a touch by applying (substantially) no force using a pointer (e.g. a finger or a stylus), the panel contact portion of which is made of a conductive material, touch-related information including touched position-related information can be produced.

When the user makes a touch by applying force using the pointer (e.g. a finger or a stylus), the panel contact portion of which is made of a conductive material, touch-related information including touched position-related information and touch force-related information can be produced.

When the user makes a touch by applying force using a pointer (e.g. a stylus), the panel contact portion of which is made of a nonconductive material, touch-related information including touch force-related information can be produced.

In the case of the separate driving method, the touch display device 100 according to exemplary embodiments can sense a touched position by sequentially driving a plurality of first electrodes E1 and then producing touched position-related information based on signals RS received from the plurality of first electrodes E1 during each touch driving section TD. During each force driving section FD, the touch display device 100 can sense touching force by producing touch force-related information by sequentially or simultaneously driving at least one first electrode among the plurality of first electrodes E1 and simultaneously driving a second electrode E2.

The touch display device 100 according to exemplary embodiments performs alternate driving, i.e. alternately performs in-phase driving and antiphase driving, instead of performing the in-phase driving alone using a first electrode driving signal DS1 and a second electrode driving signal DS2 in phase with the first electrode driving signal DS1 or the antiphase driving using a first electrode driving signal DS1 and a second electrode driving signal DS2 in antiphase with the first electrode driving signal DS1, to produce touch position information and touching force information by accurately discriminating such information during the touch mode section TM due to the simultaneous driving method or to selectively produce touch force information by accurately extracting such information during the force driving section FD due to the separate driving method.

Referring to FIG. 19, in the touch display device 100 according to exemplary embodiments, a time section, in which information regarding a single touch in the entire area of the display panel 110 is calculated, is defined as a sensing section Ts.

In the sensing section Ts, m number of first driving sections Tfd and m number of second driving sections Trd are provided. Here, m is a natural number equal to or greater than 1. Hereinafter, the first driving sections are also referred to as in-phase driving sections, while the second driving sections are also referred to as antiphase driving sections.

Referring to FIG. 19, during each touch mode section TM, the driver circuit 120 can output a first electrode driving signal DS1 to be provided to at least one first electrode among the plurality of first electrodes E1 disposed within the display panel 110 as well as a second electrode driving signal DS2 to be provided to the second electrode E2 provided outside of the display panel 110.

In the case of alternate driving, the display panel 110 can output a first electrode driving signal DS1 and a second electrode driving signal DS2 in phase with the first electrode driving signal DS1 during an in-phase driving section Tfd. During an antiphase driving section Trd after the in-phase driving section Tfd, the display panel 110 can output a first electrode driving signal DS1 and a second electrode driving signal DS2 in antiphase with the first electrode driving signal DS1.

Since the driver circuit 120 alternately performs in-phase driving and antiphase driving as described above, touching force and a touched position can be more accurately sensed based on in-phase sensing data obtained from the in-phase driving and antiphase sensing data obtained from the antiphase driving.

When the first electrode driving signal DS1 and the second driving signal DS2 are in phase with each other in the in-phase driving section Tfd, the amplitude V2 of the second driving signal DS2 is greater than the amplitude V1 of the first driving signal DS1.

Accordingly, when touch position components and touch force components are mixed in signals RS received from the plurality of first electrodes E1, it is possible to sense a touch position and touching force by accurately discriminating the touch position and the touching force.

Hereinafter, the alternate driving, which has been briefly described above, will be described with reference to specific examples.

Figure 20:
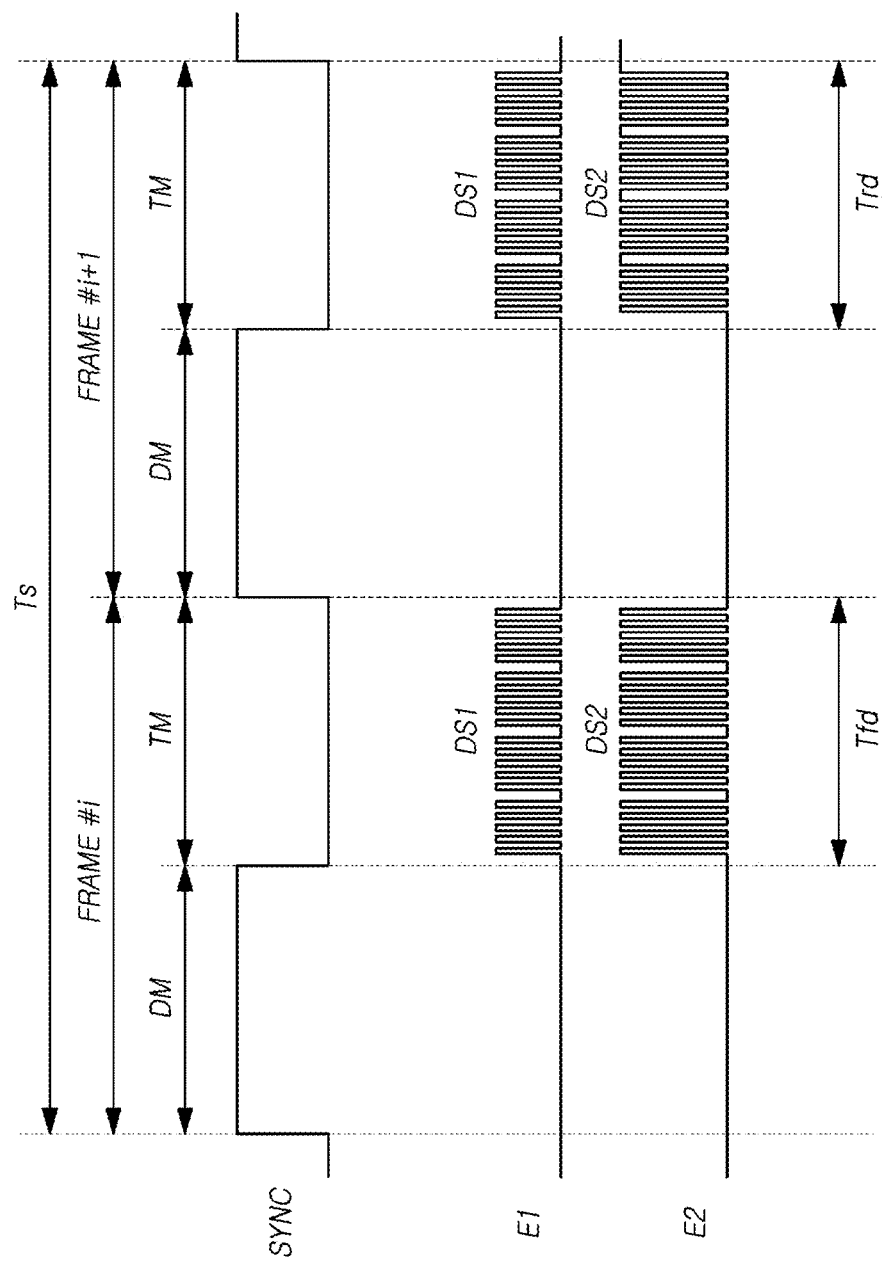
FIGS. 20 to 22 illustrate examples of alternate driving for sensing touch-related information in the touch display device according to exemplary embodiments.
Figure 21:
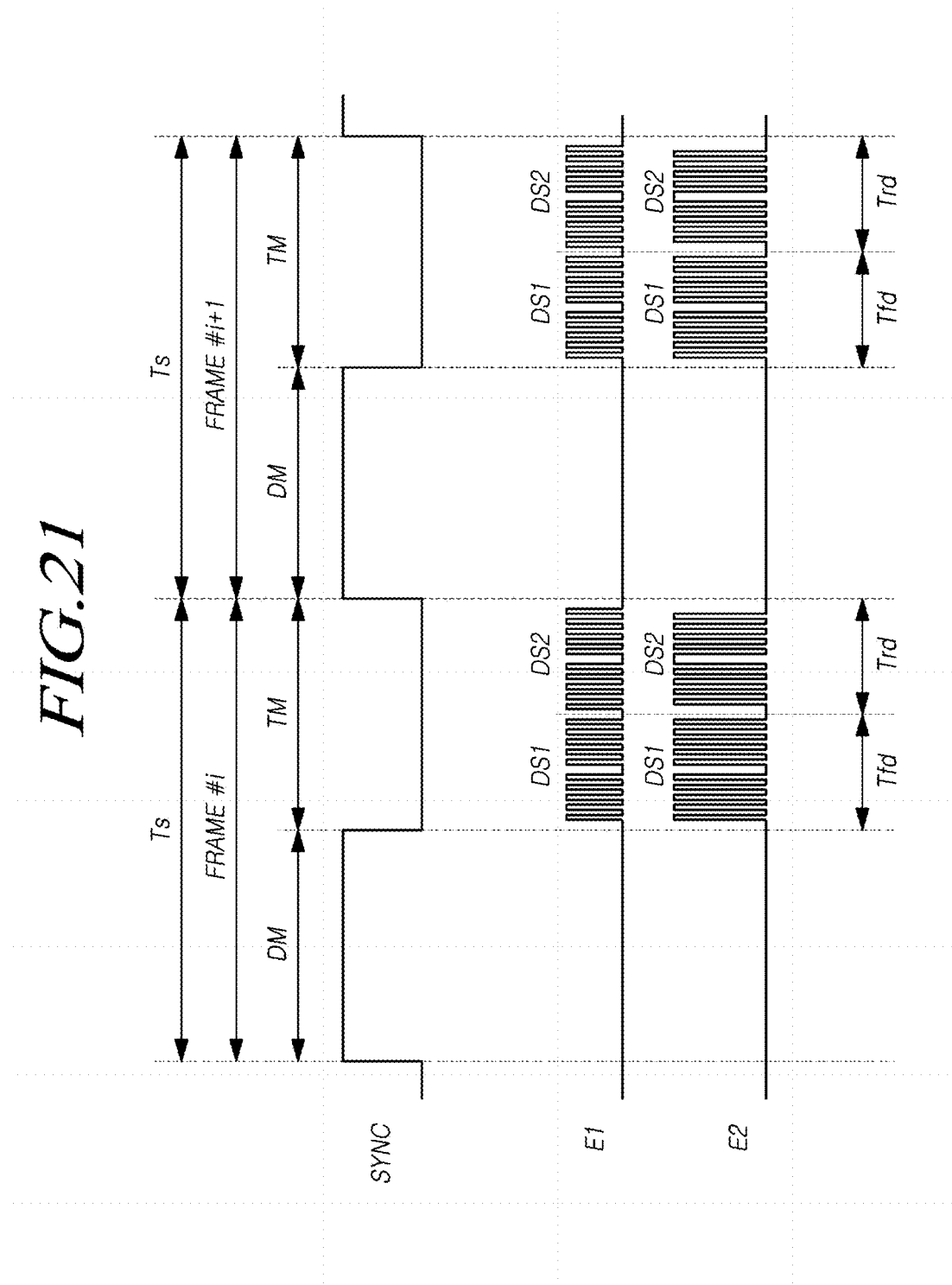
Figure 22:
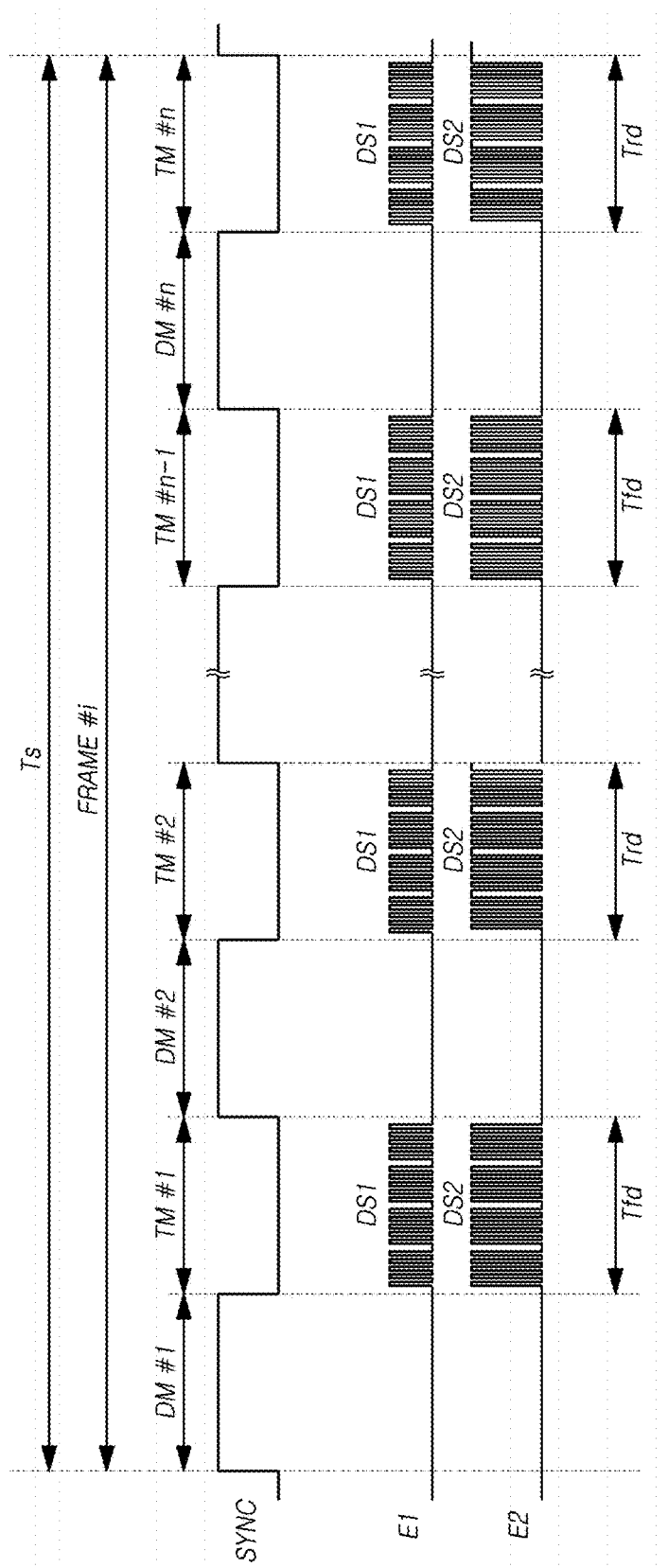

FIGS. 20 to 22 illustrate examples of alternate driving for sensing touch-related information in the touch display device 100 according to exemplary embodiments. Hereinafter, a case in which touched position sensing driving and touching force sensing driving are performed simultaneously in two consecutive frame sections FRAME #i and FRAME #i+1 is taken, for the sake of explanation.

As illustrated in FIGS. 20 and 21, a single display mode section DM and a single touch mode section TM may be present in a single frame section.

Alternatively, as illustrated in FIG. 22, two or more display mode sections DM #1, ..., and DM #n (where n is a natural number equal to or greater than 2) and two or more touch mode sections TM #1, ..., and TM #n (where n is a natural number equal to or greater than 2) may be present in a single frame section.

As described above, various numbers of the display mode sections DM and various numbers of the touch mode section TM may be designed within a single frame section, in consideration of the system environment, display performance and efficiency, touch performance and efficiency, and the like.

As illustrated in FIGS. 20 and 22, a single in-phase driving section Tfd and a single antiphase driving section Trd may be present in each touch mode section TM.

Thus, when two or more touch mode sections TM are undertaken, i.e. at least one in-phase driving section Tfd and at least one antiphase driving section Trd are undertaken, touch-related information (such as touched position-related information and touching force-related information) can be produced.

Alternatively, as illustrated in FIG. 21, both one or more in-phase driving sections Tfd and one or more antiphase driving sections Trd may be present in each touch mode section TM.

Accordingly, when a single touch mode section TM including at least one in-phase driving section Tfd and at least one antiphase driving section Trd is undertaken, touch-related information (such as touched position-related information and touching force-related information) can be produced.

As described above, different numbers of the touch mode sections TM required to produce touch-related information may be provided to alternate with the display mode sections DM.

Accordingly, the length of the sensing section Ts necessary to produce touch-related information can be adjusted efficiently in consideration of the system environment, and the touch mode sections TM and the display mode sections DM can be allocated according to the adjusted length of the sensing section Ts. Alternatively, the length of the sensing section Ts can be efficiently adjusted to be suitable for the determined touch and display mode sections TM and DM.

As illustrated in FIG. 20, a single in-phase driving section Tfd or a single antiphase driving section Trd may be present in a single frame section.

In this case, when at least two frame sections are undertaken, i.e. at least one in-phase driving section Tfd and at least one antiphase driving section Trd are undertaken, touch-related information (touched position-related information and touching force-related information) can be produced.

In addition, as illustrated in FIG. 21, a single in-phase driving section Tfd and a single antiphase driving section Trd may be present in a single frame section.

Furthermore, as illustrated in FIG. 22, two or more in-phase driving sections Tfd and two or more antiphase driving sections Trd may be present in a single frame section.

According to the section allocation methods illustrated in FIGS. 21 and 22, after a single frame section including at least one in-phase driving section Tfd and at least one antiphase driving section Trd, touch-related information (touched position-related information and touching force-related information) can be produced.

As described above, the driver circuit 120 can sense at least one of a touched position and touching force by producing touch-related information for each sensing section of preset sensing sections Ts.

The sensing section Ts means a section necessary to produce touch-related information by sensing at least one of a touched position and touching force, depending on touch types defined by pointer types and the presence of touching force, in the entire area of the display panel 110.

The sensing section Ts may correspond to a single frame section as illustrated in FIGS. 21 and 22 or to two or more frame sections as illustrated in FIG. 20.

Accordingly, the length of the sensing section Ts necessary to produce touch-related information can be adjusted efficiently in consideration of the system environment.

Referring to FIGS. 20 to 22, during a single sensing section Ts, the number of the in-phase driving sections Ts is the same as the number of the antiphase driving sections Trd.

Thus, during the sensing section Ts, a total number of driving sections obtained by summing the number of the in-phase driving sections Ts and the number of the antiphase driving sections Trd is an even number.

For example, in the case of FIG. 20, during the sensing section Ts, the number of the in-phase driving section Tfd is 1, and the number of the antiphase driving section Trd is 1, so the total number of driving sections is 2.

In another example, in the case of FIG. 21, during a single sensing section Ts, the number of the in-phase driving section Tfd is 1, and the number of the antiphase driving section Trd is 1, so the total number of driving sections is 2.

In further another example, in the case of FIG. 22, during a single sensing section Ts, the number of the in-phase driving sections Tfd is n/2, and the number of the antiphase driving sections Trd is n/2, so the total number of driving sections is n (=(n/2)+(n/2), where n is an even number equal to or greater than 2).

Since the number of the in-phase driving sections Tfd and the number of the antiphase driving sections Trd are set to be the same during a single sensing section Ts as described above, touched position-related components or touching force-related components can be selectively and accurately extracted from in-phase sensing data obtained by in-phase driving and antiphase sensing data obtained by antiphase driving.

This will be described in greater detail with reference to FIGS. 23A and 23B.

Figure 23A:
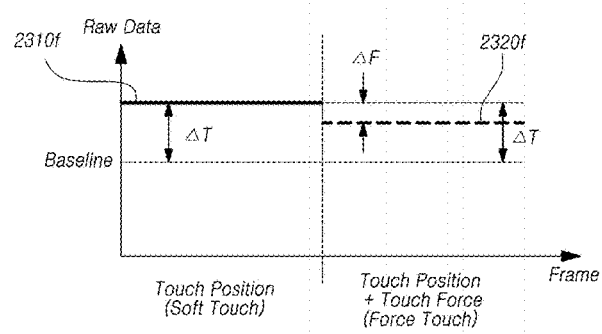
FIGS. 23A and 23B illustrate in-phase sensing data obtained by in-phase driving and antiphase sensing data obtained by antiphase driving when the touch display device according to exemplary embodiments performs alternate driving to sense touch-related information.
Figure 23B:
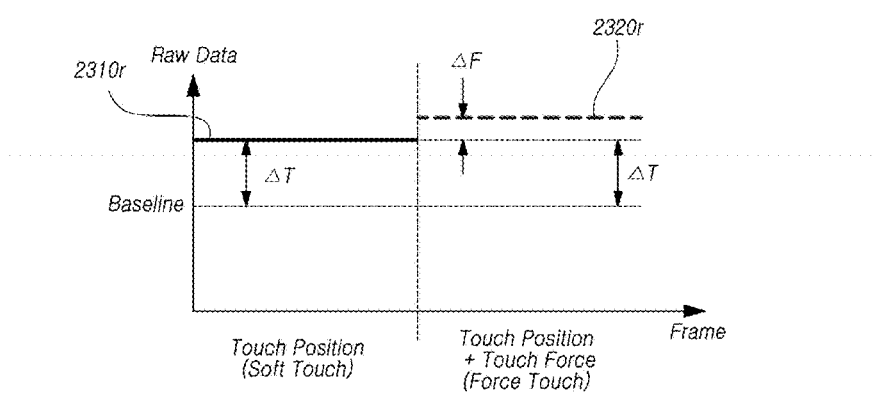

FIGS. 23A and 23B illustrate in-phase sensing data $2310f$ and $2320f$ obtained by in-phase driving and antiphase sensing data $2310r$ and $2320r$ obtained by antiphase driving when the touch display device 100 according to exemplary embodiments performs alternate driving to sense touch-related information.

FIG. 23A illustrates the in-phase sensing data $2310f$ and $2320f$ obtained based on a signal RS received through a first electrode E1 during in-phase driving. The in-phase sensing data $2310f$ is obtained in the case of a soft touch (Case 1) performed by applying an amount of pressing force equal to or less than a predetermined level using a pointer, the panel contact portion of which is made of a conductive material. The in-phase sensing data $320f$ is obtained in the case of a force touch (Case 2) performed by applying an amount of pressing force exceeding the predetermined level using the pointer, the panel contact portion of which is made of a conductive material.

Referring to FIG. 23A, the value of the in-phase sensing data $2310f$ obtained in the soft touch (Case 1) performed by applying an amount of pressing force equal to or less than the predetermined level using the pointer, the panel contact portion of which is made of a conductive material, is Baseline+$\Delta$T, calculated by adding $\Delta$T to sensing data Baseline obtained when no touch is made.

Referring to FIG. 23A, the value of the in-phase sensing data $2320f$ obtained in the force touch (Case 2) performed by applying an amount of pressing force exceeding the predetermined level using the pointer, the panel contact portion of which is made of a conductive material, is Baseline+$\Delta$T−$\Delta$F, calculated by adding $\Delta$T to sensing data Baseline obtained when no touch is made and then subtracting $\Delta$F from the sum.

FIG. 23B illustrates antiphase sensing data $2310r$ and $2320r$ obtained based on a signal RS received through a first electrode E1 during antiphase driving. The antiphase sensing data $2310r$ is obtained in the case of a soft touch (Case 1) performed by applying an amount of pressing force equal to or less than a predetermined level using a pointer, the panel contact portion of which is made of a conductive material. The antiphase sensing data $2320r$ is obtained in the case of a force touch (Case 2) performed by applying an amount of pressing force exceeding the predetermined level using the pointer, the panel contact portion of which is made of a conductive material.

Referring to FIG. 23B, the value of the antiphase sensing data $2310r$ obtained in the soft touch (Case 1) performed by applying an amount of pressing force equal to or less than the predetermined level using the pointer, the panel contact portion of which is made of a conductive material, is Baseline+$\Delta$T, calculated by adding $\Delta$T to sensing data Baseline obtained when no touch is made.

Referring to FIG. 23B, the value of the antiphase sensing data $2320r$ obtained in the force touch (Case 2) performed by applying an amount of pressing force exceeding the predetermined level using the pointer, the panel contact portion of which is made of a conductive material, is Baseline+ΔT+ΔF, calculated by adding ΔT and ΔF to sensing data Baseline obtained when no touch is made.

Referring to FIGS. 23A and 23B, ΔT is a value that varies depending on a position on the screen touched by the user. ΔT may vary depending on the closeness of the corresponding first electrode E1 to the touched position. Accordingly, ΔT is referred to as "touched position variation data."

Thus, to produce touched position-related information regarding the touched position or the occurrence of the touch, it is necessary to selectively and accurately extract the touched position variation data ΔT from the in-phase sensing data 2310*f* and 2320*f* or the antiphase sensing data 2310*r* and 2320*r*.

In addition, ΔF is a value that varies depending on an amount of force (touching force) by which the user presses against the screen. ΔF may vary depending on a change in the size of the gap between the corresponding first electrode E1 and the second electrode E2 (i.e. a change in the capacitance between the corresponding first electrode E1 and the second electrode E2). Accordingly, ΔF is referred to as "touching force variation data."

Thus, to produce touching force-related information regarding at least one of the presence of touching force, the amount of touching force, and a touching force level (the level of the amount of touching force), it is necessary to selectively and accurately extract the touching force variation data ΔF from the in-phase sensing data 2310*f* and 2320*f* or the antiphase sensing data 2310*r* and 2320*r*.

However, when in-phase driving is performed alone, it is impossible to extract the touched position variation data ΔT and the touching force variation data ΔF from the in-phase sensing data 2310*f* and 2320*f* by accurately discriminating the data ΔT and ΔF.

Likewise, when antiphase driving is performed alone, it is impossible to extract the touched position variation data ΔT and the touching force variation data ΔF from the antiphase sensing data 2310*r* and 2320*r* by accurately discriminating the data ΔT and ΔF.

Accordingly, the touch display device 100 according to exemplary embodiments can perform alternate driving to extract the touched position variation data ΔT and the touching force variation data ΔF by accurately discriminating the data ΔT and ΔF.

For example, a case in which a sensing section Ts includes a single in-phase driving section Tfd and a single antiphase driving section Trd, sensing data Baseline obtained when no touch is made is zero (0), and a soft touch (Case 1) is made by applying an amount of touching force equal to or less than a predetermined level using a pointer, the panel contact portion of which is made of a conductive material, is taken. In this case, touched position variation data ΔT (=(ΔT+ΔT)/2) can be accurately calculated by summing the in-phase sensing data 2310*f* obtained by in-phase driving and the antiphase sensing data 2310*r* obtained by antiphase driving and then dividing the sum by 2 (i.e. the total number of driving sections).

In addition, touching force variation data ΔF (=(ΔT−ΔT)/2=0) can be accurately calculated by subtracting the in-phase sensing data 2310*f* obtained by in-phase driving from the antiphase sensing data 2310*r* obtained by antiphase driving and then dividing the remainder by 2 (i.e. the total number of driving sections). The touching force variation data ΔF calculated in this manner is zero (0). The result of calculation corresponds to the current soft touch (Case 1).

In another example, a case in which a sensing section Ts includes a single in-phase driving section Tfd and a single antiphase driving section Trd, sensing data Baseline obtained when no touch is made is zero (0), and a force touch (Case 2) is made by applying an amount of touching force exceeding the predetermined level using the pointer, the panel contact portion of which is made of a conductive material, is taken. In this case, touched position variation data ΔT [=((ΔT+ΔF)+(ΔT−ΔF))/2=2ΔT/2=ΔT] can be accurately calculated by summing the antiphase sensing data 2310*r* obtained by antiphase driving and the in-phase sensing data 2310*f* obtained by in-phase driving and then dividing the sum by 2 (i.e. the total number of driving sections).

In addition, touching force variation data ΔF [=((ΔT+ΔF)−(ΔT−ΔF))/2=2ΔF/2=ΔF] can be accurately calculated by subtracting the in-phase sensing data 2310*f* obtained by in-phase driving from the antiphase sensing data 2310*r* obtained by antiphase driving and then dividing the remainder by 2 (i.e. the number of total driving sections).

Hereinafter, the alternate driving method as described above will be briefly described again.

Referring to FIGS. 23A and 23B, the antiphase sensing data 2310*r* (ΔT+ΔF, ΔF=0) or 2320*r* (ΔT+ΔF, ΔF≠0) has a greater value than the in-phase sensing data 2310*f* (ΔT−ΔF, ΔF=0) or 2320*f* (ΔT−ΔF, ΔF≠0).

In addition, the difference 2ΔF between the antiphase sensing data ΔT+ΔF and the in-phase sensing data ΔT−ΔF may be proportional to the touching force variation data ΔF.

Due to these features, the driver circuit 120 can selectively and accurately extract components related to a touched position and selectively and accurately extract components related to touching force using both the in-phase sensing data obtained by in-phase driving and the antiphase sensing data obtained by antiphase driving, thereby more accurately sensing the touched position and the touching force.

The driver circuit 120 can sense at least one of a touched position and touching force, based on in-phase sensing data obtained by digital conversion of signals RS received from the plurality of first electrodes E1 due to in-phase driving and antiphase sensing data obtained by digital conversion of signals RS received from the plurality of first electrodes E1 due to antiphase driving.

the driver circuit 120 can sense at least one of a touched position and touching force by calculating touch-related information, including at least one of touched position-related information and touching force-related information depending on the presence of the touching force and touch types (Case 1, Case 2, and Case 3), based on antiphase sensing data 2310*r* (ΔT+ΔF, ΔF=0) or 2320*r* (ΔT+ΔF, ΔF≠0) obtained by at least a single process of antiphase driving and in-phase sensing data 2310*f* (ΔT−ΔF, ΔF=0) or 2320*f* (ΔT−ΔF, ΔF≠0) obtained by at least a single process of in-phase driving during a single sensing section Ts.

As described above, the driver circuit 120 can selectively and accurately extract components related to the touched position or selectively and accurately extract components related to the touching force using both the in-phase sensing data and the antiphase sensing data obtained by alternate driving, thereby more accurately sensing the touched position and the touching force.

A method of sensing a touched position and a method of sensing touching force, in a case in which a single in-phase driving section Tfd and a single antiphase driving Trd are present in a single sensing section Ts, will be described.

First, regarding the touching force sensing function, the driver circuit 120 can calculate subtraction data 2ΔF=(ΔT+ΔF)−(ΔT−ΔF) by subtracting the in-phase sensing data 2310*f* (ΔT−ΔF, ΔF=0) or 2320*f* (ΔT−ΔF, ΔF≠0) from the antiphase sensing data 2310*r* (ΔT+ΔF, ΔF=0) or 2320*r*

($\Delta T+\Delta F$, $\Delta F \neq 0$) and then calculate touching force variation data $\Delta F = 2\Delta F/2$ by dividing the subtraction data $2\Delta F$ by the total number of sections (i.e. a sum of the number of the antiphase driving sections and the number of the in-phase driving sections), during the single sensing section Ts.

The driver circuit 120 can produce touch-related information, corresponding to touching force-related information regarding at least one of the presence of touching force, the amount of the touching force, and a touching force level, based on the touching force variation data $\Delta F$.

For example, when touching force variation data $\Delta F$ calculated with respect to all of the plurality of first electrodes E1 is zero (0), it is determined that no touching force has been generated. In addition, touching force variation data $\Delta F$ calculated with respect to at least one first electrode among the plurality of first electrodes E1 is not zero (0), it can be determined that touching force has been generated. The amount of the touching force as well as the level thereof (i.e. the touching force level) can be calculated depending on the amount of the touching force variation data $\Delta F$.

According to the sensing processing based on the above-described calculation, the driver circuit 120 can selectively and accurately extract components related to touching force (touching force variation data) by performing calculation (subtraction and division) on antiphase sensing data and in-phase sensing data obtained by alternate driving, thereby more accurately sensing the touching force.

Subsequently, in relation to touched position sensing, during the sensing section Ts, the driver circuit 120 can calculate sum data $2\Delta T$ by summing the antiphase sensing data $2310r$ ($\Delta T+\Delta F$, $\Delta F=0$) or $2320r$ ($\Delta T+\Delta F$, $\Delta F \neq 0$) and the in-phase sensing data $2310f$ ($\Delta T-\Delta F$, $\Delta F=0$) or $2320f$ ($\Delta T-\Delta F$, $\Delta F \neq 0$) and then calculate touched position variation data $\Delta T = 2\Delta T/2$ by dividing the sum data $2\Delta T = (\Delta T+\Delta F)+(\Delta T-\Delta F)$ by a total number of driving sections.

The driver circuit 120 can produce touch-related information corresponding to touched position-related information regarding at least one of the occurrence of a touch and a touched position, based on the touched position variation data $\Delta T$.

The driver circuit 120 can determine the occurrence of the touch and the touched position by comparing the touched position variation data $\Delta T$ of the plurality of first electrodes E1 to each other.

For example, when touched position variation data $\Delta T$ calculated with respect to all of the plurality of first electrodes E1 is zero (0), it is determined that no touch has been made. When touched position variation data $\Delta T$ calculated with respect to a specific first electrode among the plurality of first electrodes E1 is the greatest, it can be determined that a touch has been made at a point at which the specific first electrode E1 is located, and accurate coordinates of the point can be obtained by comparing the amount of the touched position variation data $\Delta T$ to those of the other adjacent first electrodes E1.

According to the sensing processing based on the above-described calculation, the driver circuit 120 can selectively and accurately extract components related to the touched position (i.e. touched position variation data) by performing calculation (addition and division) on the antiphase sensing data and the in-phase sensing data obtained by alternate driving, thereby more accurately sensing the touched position.

Hereinafter, the method of driving the touch display device 100 according to exemplary embodiments as described above will be briefly described again with reference to FIG. 24.

Figure 24:
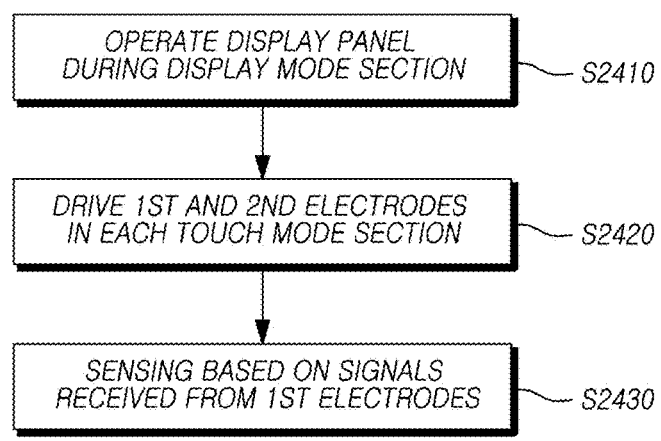
FIG. 24 is a flowchart illustrating the method of driving the touch display device according to exemplary embodiments.

FIG. 24 is a flowchart illustrating the method of driving the touch display device 100 according to exemplary embodiments.

Referring to FIG. 24, the method of driving the touch display device 100 according to exemplary embodiments includes: a first driving step S2410 of outputting a first electrode driving signal DS1 to be provided to at least one first electrode of a plurality of first electrodes E1 disposed within the display panel 110, as well as a second electrode driving signal DS2 to be provided to a second electrode E2 located outside of the display panel 110, during a first driving section (in-phase driving section); a second driving step S2420 of outputting a first electrode driving signal DS1 to be provided to at least one first electrode among the plurality of first electrodes E1, as well as a second electrode driving signal DS2 to be provided to the second electrode E2, during a second driving section (antiphase driving section) after the first driving section; and a sensing processing step S2430 of sensing at least one of a touched position and touching force based on sensing data (in-phase sensing data) obtained in the first driving step S2410 and sensing data (antiphase sensing data) obtained in the second driving step S2420.

The first driving step S2410 and the second driving step S2420 are steps in which alternate driving is performed. The first driving step S2410 and the second driving step S2420 may be repeated twice or more before the sensing processing step S2430 is performed.

In the first driving step S2410, the first electrode driving signal DS1 and the second electrode driving signal DS2 may be in phase with each other. In the second driving step S2420, the first electrode driving signal DS1 and the second electrode driving signal DS2 may be in antiphase with each other.

The first driving section (in-phase driving section) and the second driving section (antiphase driving section) are temporally consecutive sections or separated sections. When the first driving section and the second driving section are separated from each other, a display mode section may be located between the first driving section and the second driving section.

The first driving section and the second driving section may be present in a single touch mode section TM or may be present in different touch mode sections TM, respectively.

In addition, first driving section and the second driving section may be present in a single frame section or may be present in different frame sections, respectively.

The use of the above-described driving method allows in-phase driving and antiphase driving to be performed alternately to sense touching force, so that touching force-related information regarding touching force can be accurately produced. Thus, the touching force can be more accurately sensed.

In addition, the use of the above-described driving method allows in-phase driving and antiphase driving to be performed alternately, so that touched position-related information regarding a touched position can be more accurately produced. Thus, the touched position can be more accurately sensed.

Figure 25:
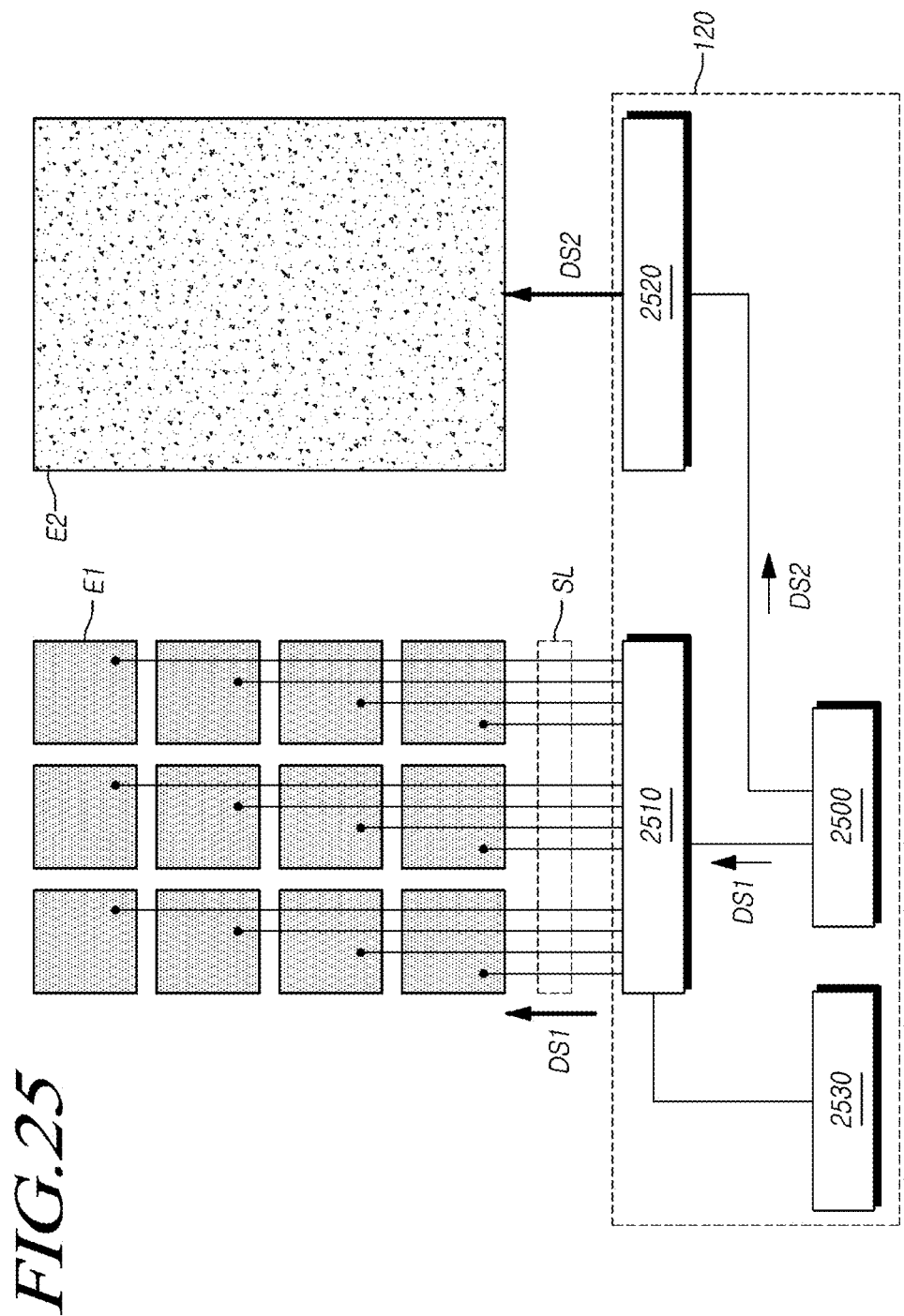
FIGS. 25 and 26 illustrate a driver circuit for performing simultaneous driving in the touch display device according to exemplary embodiments.
Figure 26:
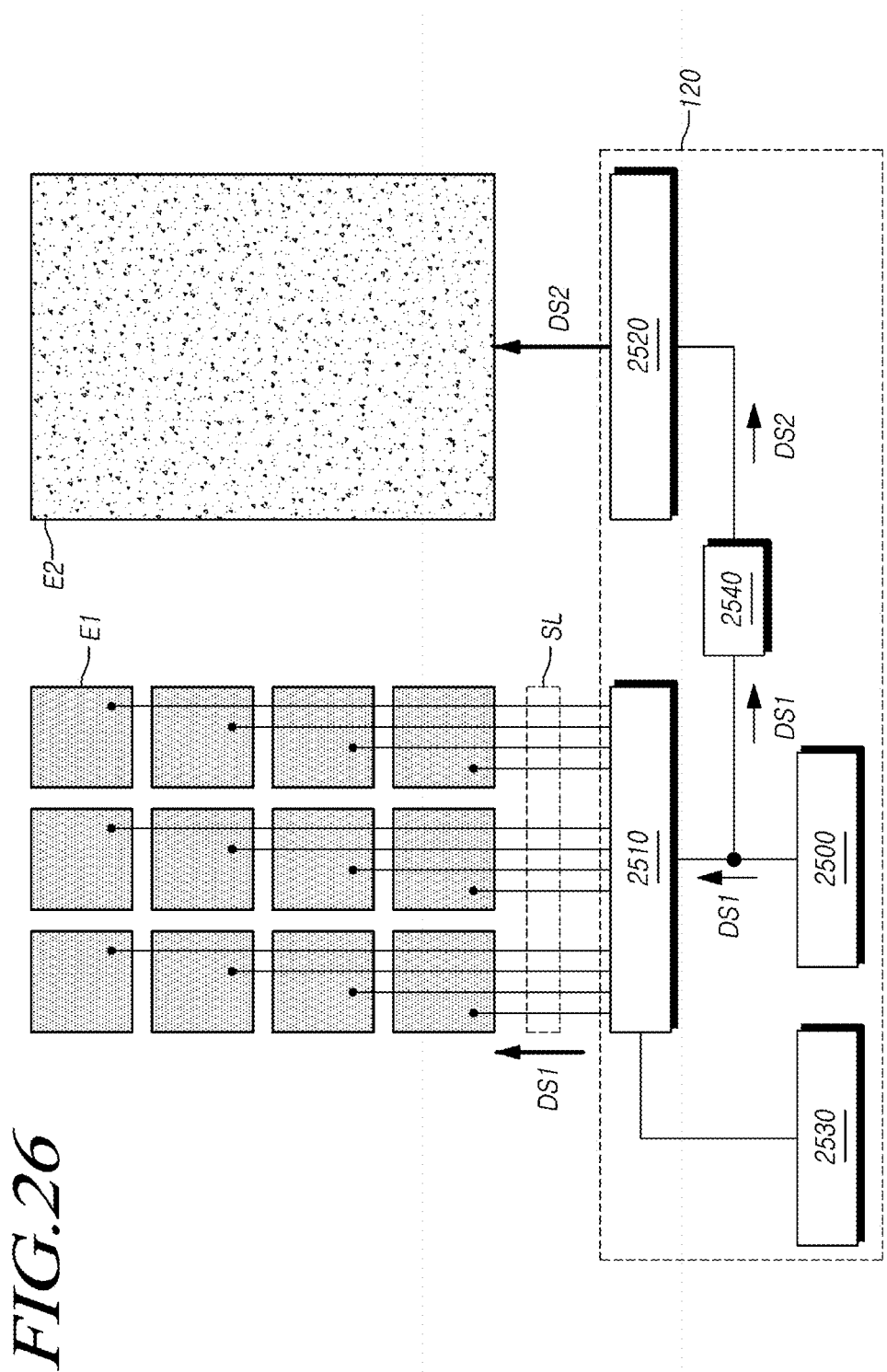

FIGS. 25 and 26 illustrate the driver circuit 120 for performing simultaneous driving in the touch display device 100 according to exemplary embodiments.

Referring to FIGS. 25 and 26, the touch display device 100 according to exemplary embodiments senses a touched position and touching force by performing driving for sensing the touched position and driving for sensing the touching force during at least one touch mode section TM.

The touch display device 100 according to exemplary embodiments can simultaneously or separately perform the driving for sensing the touched position and the driving for sensing the touching force during at least one touch mode section TM.

The driver circuit 120 of the touch display device 100 includes a signal generator circuit 2500, a first electrode driver circuit 2510, and a second electrode driver circuit 2520.

Referring to FIGS. 25 and 26, the signal generator circuit 2500 generates and outputs a first electrode driving signal DS1.

The signal generator circuit 2500 can further generate a second electrode driving signal DS2. Here, FIG. 25 illustrates the driver circuit 120 when the signal generator circuit 2500 generates the second electrode driving signal DS2, while FIG. 26 illustrates the driver circuit 120 when the signal generator circuit 2500 does not generate the second electrode driving signal DS2.

Referring to FIGS. 25 and 26, the first electrode driver circuit 2510 can apply a display driving voltage (e.g. a common voltage) to a plurality of first electrodes E1 disposed within the display panel 110 in a display mode section DM and provide a first electrode driving signal DS1 to at least one first electrode among the plurality of first electrodes E1 disposed within the display panel 110 in a touch mode section TM.

The first electrode driver circuit 2510 may include the integrator 730, the analog-to-digital converter ADC, and the like, illustrated in FIG. 7.

In a case in which the plurality of first electrodes E1 belong to display driving electrodes to which a display driving voltage DDV is applied in the display mode section DM, the first electrode driver circuit 2510 can apply the display driving voltage to all of the plurality of first electrodes E1 in the display mode section DM.

Thus, the plurality of first electrodes E1 act as display driving electrodes in the display mode section DM while acting as touch sensors and force sensors in the touch mode section TM.

Referring to FIGS. 25 and 26, the second electrode driver circuit 2520 is a circuit providing a second electrode driving signal DS2 to a second electrode E2 located outside of the display panel 110 in the touch mode section TM.

For example, the second electrode driver circuit 2520 may be embodied as a single printed circuit provided with signal lines, through which the second electrode driving signal DS2 is delivered to the second electrode E2.

In addition, the touch display device 100 according to exemplary embodiments alternately performs in-phase driving and antiphase driving to sense touching force.

Accordingly, the first electrode driving signal DS1 provided to the plurality of first electrodes E1 by the first electrode driver circuit 2510 and the second electrode driving signal D2 provided to the second electrode E2 by the second electrode driver circuit 2520 are in phase with each other in a preset in-phase driving section Tfd and in antiphase with each other in a preset antiphase driving section Trd after the in-phase driving section Tfd.

That is, the first electrode driver circuit 2510 can output a display driving voltage (e.g. a common voltage) to be provided to the plurality of first electrodes E1 disposed within the display panel 110 during the display mode section DM and output the first electrode driving signal DS1 to be provided to at least one first electrode among the plurality of first electrodes E1 during each touch mode section TM.

At or within each touch mode section TM, the first electrode driving signal DS1 output by the first electrode driver circuit 2510 may have the same phase as (in phase with) or a phase difference of 180 degrees from (in antiphase with) the second electrode driving signal DS2 provided to the second electrode E2 located outside of the display panel 110.

Regarding changes in phase relationship for alternation between in-phase relationship and antiphase relationship, the phase of the first electrode driving signal DS1 may remain unchanged, while the phase of the second electrode driving signal DS2 changes. The phase of the first electrode driving signal DS1 may change, while the phase of the second electrode driving signal DS2 remains unchanged. In addition, both the phase of the first electrode driving signal DS1 and the phase of the second electrode driving signal DS2 may change.

The use of the above-described driver circuit 120 can provide a touch sensing function to sense a touched position and a force sensing function to sense touching force.

In addition, the use of the above-described driver circuit 120 allows in-phase driving and antiphase driving to be performed alternately to sense touching force, so that touching force-related information regarding touching force can be selectively and accurately produced. Thus, the touching force can be more accurately sensed.

Referring to FIG. 25, the signal generator circuit 2500 can further generate and output the second electrode driving signal DS2.

Thus, the second electrode driver circuit 2520 can deliver the second electrode driving signal DS2, output by the signal generator circuit 2500, to the second electrode E2.

As illustrated in FIG. 25, the signal generator circuit 2500 generates and outputs not only the first electrode driving signal DS1 but also the second electrode driving signal DS2. Thus, the use of the second electrode driving signal DS2 having a different form from the first electrode driving signal DS1 may facilitate driving in the touch mode section TM.

Referring to FIG. 26, the signal generator circuit 2500 does not generate the second electrode driving signal DS2, and the driver circuit 120 may further include a signal converter 2540 generating the second electrode driving signal DS2 by converting the first electrode driving signal DS1 generated by the signal generator circuit 2500.

The signal converter 2540 can generate the second electrode driving signal DS2, for example, by converting at least one of the amplitude and phase of the first electrode driving signal DS1.

When the signal converter 2540 is used, the signal generator circuit 2500 is only required to generate the first electrode driving signal DS1. The load of signal processing can consequently be reduced, and thus effective touch driving can be provided.

The signal converter 2540 may include, for example, a level shifter adjusting a signal voltage level, a phase controller controlling a signal phase, and a DA converter converting a direct current (DC) signal into an alternating current (AC) signal (or pulse signal) or an AD converter converting an AC signal (or pulse signal) into a DC signal. The signal converter 2540 may be regarded as being the second electrode driver circuit 2520 or may be regarded as being included in the second electrode driver circuit 2520.

Referring to FIGS. 25 and 26, the driver circuit 120 further includes a sensing processor 2530 sensing the touching force of a touch, based on a signal RS received from at least one first electrode among the plurality of first electrodes E1 through the first electrode driver circuit 120 in at least one touch mode section TM.

In the case of simultaneous driving, the sensing processor 2530 can sense both the touched position and touching force of a single touch, based on the signal RS received from at least one first electrode among the plurality of first electrodes E1 through the first electrode driver circuit 120. In the case of separate driving, the sensing processor 2530 can sense the touched position of a single touch in a section in which the touching force of the touch is sensed and in another section, based on the signal RS received from at least one first electrode E1 through the first electrode driver circuit 120.

The sensing processor 2530 may be a component corresponding to the processor 740 illustrated in FIG. 7.

As described above, the sensing processor 2530 can sense the touched position and the touching force by receiving the signal RS from the first electrode E1 through the first electrode driver circuit 2510, thereby efficiently performing two types of sensing using the same processing method.

The signal generator circuit 2500, the first electrode driver circuit 2510, and the sensing processor 2530 may be embodied as separate integrated circuits (ICs) or processors, respectively.

For example, the signal generator circuit 2500 may be embodied as a power IC, and the sensing processor 2530 may be a micro control unit (MCU). The first electrode driver circuit 2510 may be embodied as a first electrode driver IC.

At least two of the signal generator circuit 2500, the first electrode driver circuit 2510, and the sensing processor 2530 may be embodied as a single IC.

For example, the signal generator circuit 2500 and the first electrode driver circuit 2510 may be portions of a single IC.

In another example, the signal generator circuit 2500, the first electrode driver circuit 2510, and the sensing processor 2530 may be embodied as integrated portions of a single IC.

The first electrode driver circuit 2510 may further include a data driver circuit applying data voltages to a plurality of data lines disposed on the display panel 110 in a display mode section.

Since the driver circuit 120 can be embodied in various forms as described above, the driver circuit 120 can be optimally designed to be suitable for the size of the touch display device 100 (e.g. the size of a medium-sized or larger television, the size of a mobile terminal, or the like), the system environment, the power supply environment, or the like.

Figure 27:
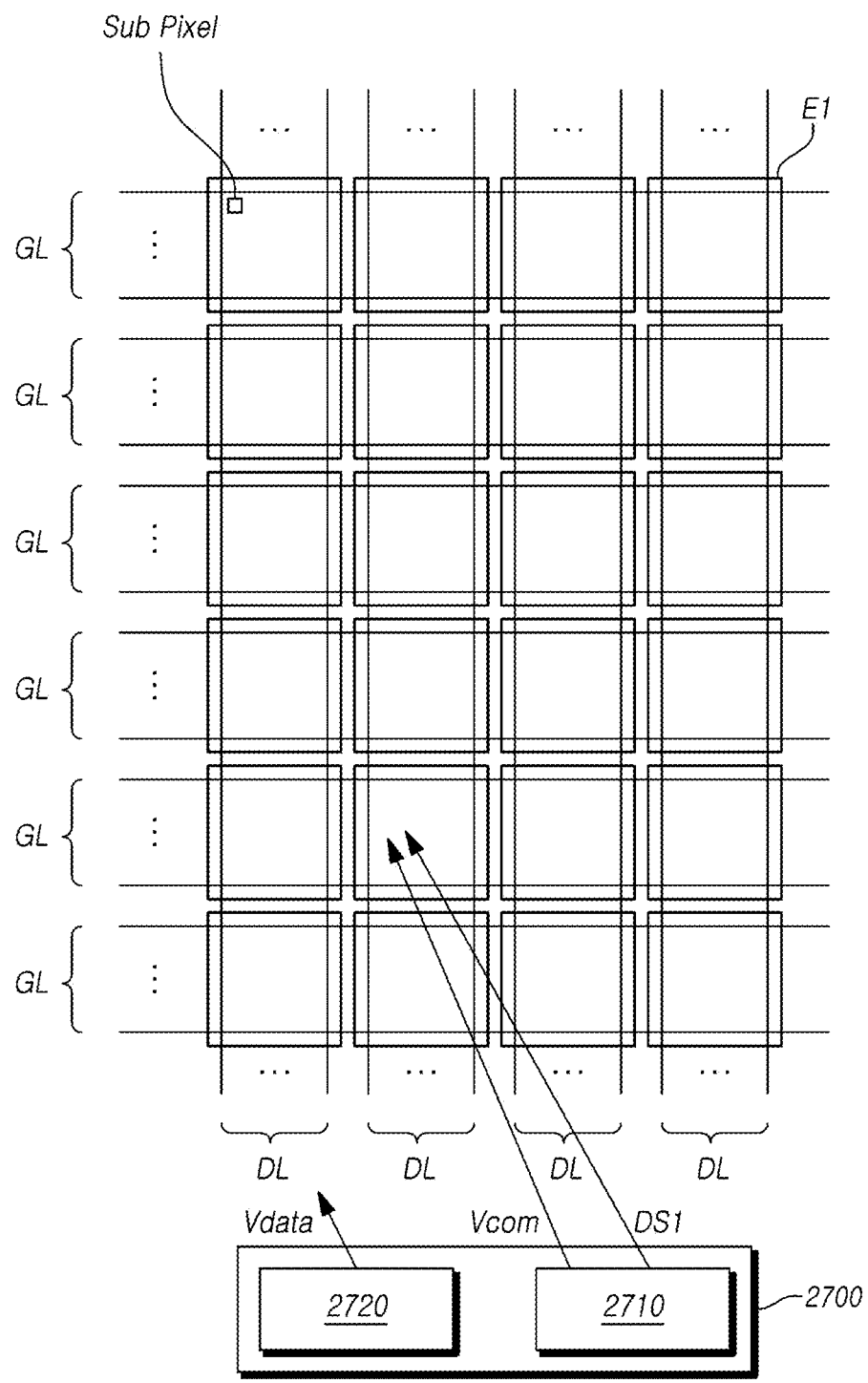
FIG. 27 illustrates an exemplary display driver chip in the touch display device according to exemplary embodiments.

FIG. 27 illustrates an exemplary display driver chip 2700 in the touch display device 100 according to exemplary embodiments.

Referring to FIG. 27, the display driver chip 2700 includes a first electrode driver 2710 driving a plurality of first electrodes E1 in a display mode section DM and a touch mode section TM and a data voltage driver 2720 outputting data voltages Vdata to drive a plurality of data lines DL disposed on the display panel 110 in the display mode section DM.

The first electrode driver 2710 provides a common voltage, i.e. a type of display driving voltage, to the plurality of first electrodes E1 during the display mode section DM.

The first electrode driver 2710 provides a first electrode driving signal DS1 to the plurality of first electrodes E1 during the touch mode section TM. Here, the first electrode driving signal DS1 may be a driving signal for sensing a touched position, a driving signal for sensing touching force, or a driving signal for sensing both the touched position and the touching force.

The first electrode driver 2710 may be a component corresponding to the first electrode driver circuit 2510 illustrated in FIGS. 25 and 26.

The display driver chip 2700 may further include the signal generator circuit 2500, as well as the sensing processor 2530, illustrated in FIGS. 25 and 26.

A plurality of data lines DL and a plurality of gate lines GL are disposed on the display panel 110. A number of subpixels are defined by the plurality of data lines DL and the plurality of gate lines GL.

The size of each area of the plurality of first electrodes E1 may be equal to or greater than the size of a single subpixel region. The plurality of first electrodes E1 may be designed in a variety of sizes for driving and sensing efficiencies.

According to exemplary embodiments as set forth above, the driver circuit 120, the touch display device 100, and the method of driving the touch display device are intended to provide a large number of functions in a variety of forms. When a touch is made by a user, not only touch coordinates (i.e. a touched position) but also touching force corresponding to an amount of force by which the user presses against the screen can be sensed.

In addition, according to exemplary embodiments, the touch display device 100, the driver circuit 120, and the method of driving the touch display device are provided. The touch display device 100 has a structure (e.g. a gap and a structure designed for the gap) that can sense touching force corresponding to an amount of force by which the user presses against the screen when touching the screen.

Furthermore, according to exemplary embodiments, the driver circuit 120, the touch display device 100, and the method of driving the touch display device can accurately sense touching force by selectively and accurately extracting touching force components (touching force variation data) from sensing data obtained by touching force sensing driving (i.e. driving for selectively sensing the touching force or driving for sensing a touched position in addition to the touching force).

In addition, according to exemplary embodiments, the driver circuit 120, the touch display device 100, and the method of driving the touch display device can accurately sense a touched position by selectively and accurately extracting touched position components (touched position variation data) from sensing data obtained by touched position sensing driving (i.e. driving for selectively sensing the touched position or driving for sensing touching force in addition to the touched position).

Furthermore, according to exemplary embodiments, the driver circuit 120, the touch display device 100, and the method of driving the touch display device can sense touching force by applying a first electrode driving signal and a second electrode driving signal to first electrodes corresponding to force sensors and a second electrode. The touching force can be accurately sensed by alternately performing in-phase driving, in which the first electrode driving signal and the second electrode driving signal in phase with the first electrode driving signal are provided to the first electrodes and the second electrode, and antiphase driving, in which the first electrode driving signal and the second electrode driving signal in antiphase with the first electrode driving signal are provided to the first electrodes and the second electrode.

It will be apparent to those skilled in the art that various modifications and variations can be made in the driver circuit, the touch display device, and the method of driving the touch display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch display device, comprising:
   a display panel;
   a plurality of first electrodes disposed within the display panel;
   a second electrode located outside of the display panel; and
   a driver circuit outputting a first electrode driving signal to be provided to at least one first electrode among the plurality of first electrodes and outputting a second electrode driving signal to be provided to the second electrode during each of touch mode sections,
   wherein the driver circuit outputs the first electrode driving signal and the second electrode driving signal in phase with each other during a first driving section, and
   wherein the driver circuit outputs the first electrode driving signal and the second electrode driving signal in antiphase with each other, and the first and second electrode driving signals in antiphase with each other are provided to the at least one first electrode and the second electrode respectively during a second driving section after or before the first driving section.

2. The touch display device according to claim 1, wherein, when the first electrode driving signal and the second electrode driving signal are in phase with each other, the second electrode driving signal has a greater amplitude than the first electrode driving signal.

3. The touch display device according to claim 1, wherein at least one first driving section or at least one second driving section is present during each of the touch mode sections.

4. The touch display device according to claim 1, wherein the driver circuit senses at least one of a touched position and touching force by producing touch-related information in each of preset sensing sections, each of the preset sensing sections corresponding to one or more frame sections.

5. The touch display device according to claim 4, wherein, during a single sensing section of the sensing sections, a number of the first driving sections is equal to a number of the second driving sections, and a total number obtained by summing the number of the first driving sections and the number of the second driving sections is an even number.

6. The touch display device according to claim 5, wherein the driver circuit produces the touch-related information based on antiphase sensing data corresponding to a sensing value obtained by at least one process of antiphase driving and in-phase sensing data corresponding to a sensing value obtained by at least one process of in-phase driving during the sensing section.

7. The touch display device according to claim 6, wherein the driver circuit calculates subtraction data by performing subtraction on the antiphase sensing data and the in-phase sensing data during the sensing section, calculates touching force variation data by dividing the subtraction data by the total number of the driving sections, and produces the touch-related information regarding at least one of presence of the touching force, an amount of the touching force, and a touching force level based on the touching force variation data.

8. The touch display device according to claim 6, wherein the driver circuit calculates sum data by summing the antiphase sensing data and the in-phase sensing data during the sensing section, calculates touched position variation data by dividing the sum data by the total number of the driving sections, and produces the touch-related information regarding at least one of occurrence of the touch and the touched position based on the touched position variation data.

9. The touch display device according to claim 6, wherein the antiphase sensing data has a greater value than the in-phase sensing data.

10. The touch display device according to claim 9, wherein a difference between the antiphase sensing data and the in-phase sensing data is proportional to a touching force variation.

11. The touch display device according to claim 1, wherein the driver circuit senses at least one of a touched position and touching force based on a signal received from the at least one first electrode.

12. The touch display device according to claim 1, wherein at least one gap is provided between the plurality of first electrodes and the second electrode, a size of the gap being variable depending on touching force applied to the display panel.

13. The touch display device according to claim 1, wherein the second electrode is located below or within a lower structure of the display panel.

14. A method of driving a touch display device, comprising:
   first driving of outputting a first electrode driving signal to be provided to at least one first electrode among a plurality of first electrodes disposed within a display panel and outputting a second electrode driving signal to be provided to a second electrode located outside of the display panel during a first driving section;
   second driving of outputting a first electrode driving signal to be provided to at least one first electrode among the plurality of first electrodes and a second electrode driving signal to be provided to the second electrode located outside of the display panel during a second driving section after or before the first driving section; and
   sensing at least one of a touched position and touching force based on sensing data obtained in the first driving and sensing data obtained in the second driving, wherein
   in the first driving, the first electrode driving signal and the second electrode driving signal are respectively provided to the at least one first electrode and the second electrode in phase with each other, and
   in the second driving, the first electrode driving signal and the second electrode driving signal are respectively provided to the at least one first electrode and the second electrode in antiphase with each other.

15. A driver circuit, comprising:
   a signal generator circuit generating and outputting a first electrode driving signal;
   a first electrode driver circuit providing the first electrode driving signal to at least one first electrode among a plurality of first electrodes disposed within a display panel during each of touch mode sections; and
   a second electrode driver circuit providing a second electrode driving signal to a second electrode located outside of the display panel during each of the touch mode sections,
   wherein the first electrode driving signal and the second electrode driving signal are respectively provided to the at least one first electrode and the second electrode in phase with each other during a preset first driving section, and wherein the first electrode driving signal and the second electrode driving signal are respectively provided to the at least one first electrode and the second electrode in antiphase with each other during a preset second driving section after or before the first driving section.

16. The driver circuit according to claim 15, wherein the signal generator circuit generates and outputs the second electrode driving signal.

17. The driver circuit according to claim 15, further comprising a signal converter generating the second electrode driving signal by converting the first electrode driving signal.

18. The driver circuit according to claim 15, further comprising a sensing processor sensing touching force of a touch based on a signal received from the at least one first electrode through the first electrode driver circuit during each of the touch mode sections.

19. The driver circuit according to claim 18, wherein the signal generator circuit, the first electrode driver circuit, and the sensing processor comprise separate integrated circuits, respectively, or at least two of the signal generator circuit, the first electrode driver circuit, and the sensing processor comprise a single integrated circuit.

20. The method according to claim 19, wherein the first driving section and the second driving section are present in a single frame section or in different frame sections.

* * * * *